US012613333B2

(12) United States Patent
Sheen et al.

(10) Patent No.: US 12,613,333 B2
(45) Date of Patent: Apr. 28, 2026

(54) IMAGING SYSTEMS AND IMAGING METHODS

(71) Applicant: Battelle Memorial Institute, Richland, WA (US)

(72) Inventors: David M. Sheen, Richland, WA (US); Richard Trevor Clark, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 443 days.

(21) Appl. No.: 18/133,777

(22) Filed: Apr. 12, 2023

(65) Prior Publication Data

US 2024/0345244 A1 Oct. 17, 2024

(51) Int. Cl.
*G01S 13/90* (2006.01)
*G01S 13/88* (2006.01)
*H01Q 21/06* (2006.01)

(52) U.S. Cl.
CPC ........ *G01S 13/9056* (2019.05); *G01S 13/887* (2013.01); *H01Q 21/065* (2013.01)

(58) Field of Classification Search
CPC .... G01S 13/887; G01S 13/89; G01S 13/9056; G01S 7/03; H01Q 21/065
See application file for complete search history.

(56) References Cited

U.S. PATENT DOCUMENTS

| | | | |
|---|---|---|---|
| 5,146,234 A | 9/1992 | Lalezari | |
| 6,507,309 B2 * | 1/2003 | McMakin | G01S 7/41 |
| | | | 342/179 |
| 7,405,692 B2 * | 7/2008 | McMakin | G01S 13/887 |
| | | | 342/44 |

(Continued)

FOREIGN PATENT DOCUMENTS

| | | |
|---|---|---|
| GB | 2510969 | 8/2014 |
| WO | WO 2019/032588 | 2/2019 |

(Continued)

OTHER PUBLICATIONS

Ahmed et al., "A Novel Fully Electronic Active Real-Time Imager Based on a Planar Multistatic Sparse Array", IEEE Transactions on Microwave Theory and Techniques vol. 59, No. 12, Dec. 2011, United States, pp. 3567-3576.

(Continued)

*Primary Examiner* — Peter M Bythrow
(74) *Attorney, Agent, or Firm* — Wells St. John P.S.

(57) ABSTRACT

Imaging systems and associated methods are described. According to one aspect, an imaging system includes processing circuitry configured to: access radar data for a plurality of sampling points at a plurality of different locations of an imaging aperture, and wherein the radar data results from the transmission and reception of electromagnetic energy via an antenna array with respect to a target imaging volume; access a plurality of different weightings that correspond to different ones of the sampling points of the imaging aperture; focus the radar data of the sampling points to generate an image of the target imaging volume; and wherein the processing circuitry is configured to use the different weightings of the sampling points to focus the radar data of respective ones of the sampling points.

27 Claims, 15 Drawing Sheets

(56) References Cited

U.S. PATENT DOCUMENTS

| | | | |
|---|---|---|---|
| 7,592,944 B2 | 9/2009 | Fullerton et al. | |
| 8,531,915 B2 * | 9/2013 | Ammar | G01S 15/8904 |
| | | | 367/87 |
| 9,316,732 B1 | 4/2016 | Mohamadi | |
| 9,715,012 B2 | 7/2017 | Fernandes et al. | |
| 9,917,355 B1 | 3/2018 | Lee et al. | |
| 10,353,067 B2 | 7/2019 | Moulder et al. | |
| 10,495,748 B2 * | 12/2019 | Daisy | G01N 23/046 |
| 10,585,185 B2 | 3/2020 | Ahmed et al. | |
| 10,983,199 B2 | 4/2021 | Adams et al. | |
| 11,194,038 B2 | 12/2021 | Moulder et al. | |
| 11,520,069 B2 | 12/2022 | Jones et al. | |
| 11,715,228 B2 | 8/2023 | Sheen et al. | |
| 11,843,166 B2 | 12/2023 | Grando et al. | |
| 2007/0139248 A1 | 6/2007 | Baharav et al. | |
| 2013/0121529 A1 * | 5/2013 | Fleisher | G01S 7/412 |
| | | | 382/103 |
| 2014/0320331 A1 | 10/2014 | Fernandes et al. | |
| 2015/0084645 A1 | 3/2015 | Kayano et al. | |
| 2015/0285901 A1 * | 10/2015 | Rose | G01S 7/41 |
| | | | 382/154 |
| 2017/0227636 A1 | 8/2017 | Moulder et al. | |
| 2019/0049566 A1 | 2/2019 | Adams et al. | |
| 2019/0167500 A1 | 6/2019 | Baker et al. | |
| 2020/0003884 A1 | 1/2020 | Arkind et al. | |
| 2020/0319331 A1 | 10/2020 | Sheen et al. | |
| 2020/0319332 A1 | 10/2020 | Sheen et al. | |
| 2020/0320731 A1 * | 10/2020 | Sheen | G06F 3/04815 |
| 2021/0325560 A1 * | 10/2021 | Jones | G01S 13/887 |
| 2023/0059523 A1 | 2/2023 | Cattle et al. | |
| 2023/0273310 A1 | 8/2023 | Fernandes et al. | |
| 2024/0013472 A1 * | 1/2024 | Clark | G06T 15/08 |
| 2024/0118411 A1 | 4/2024 | Sheen et al. | |
| 2024/0341614 A1 | 10/2024 | Clark et al. | |
| 2024/0345242 A1 | 10/2024 | Sheen et al. | |

FOREIGN PATENT DOCUMENTS

| | | |
|---|---|---|
| WO | WO PCT/US2024/012701 | 5/2024 |
| WO | WO PCT/US2024/016919 | 7/2024 |

OTHER PUBLICATIONS

Ahmed et al., "Advanced Microwave Imaging", IEEE Microwave Magazine vol. 13, Issue 6, 2012, United States, pp. 26-43.

Ahmed et al., "Fully Electronic Active E-Band Personnel Imager with 2 m2 Aperture", IEEE/MTT-S International Microwave Symposium Digest, Jun. 17-22, 2012, United States, 3 pages.

Ahmed, "Electronic Microwave Imaging with Planar Multistatic Arrays", thesis submitted for the doctoral degree Doctor of Engineering, 2013, Germany, 230 pages.

Ahmed, "Microwave Imaging in Security—Two Decades of Innovation", IEEE Journal of Microwaves vol. 1, No. 1, Jan. 2021, United States, pp. 191-201.

Appleby et al., "Standoff Detection of Weapons and Contraband in the 100 GHz to 1 THz Region", IEEE Transactions on Antennas and Propagation, vol. 55, No. 11, Nov. 2007, United States, pp. 2944-2956.

Baran et al., "Automatic Rigging and Animation of 3D Characters", ACM Transactions on Graphics vol. 26, No. 3, Article 72, Jul. 2007, United States, 8 pages.

Bennett et al., "A Novel Radar Array and its Imaging Properties", IEEE Transactions on Antennas and Propagation vol. AP-27, No. 4, Jul. 1979, United States, pp. 567-570.

Brem et al., "A Shooting and Bouncing Ray (SBR) Modeling Framework Involving Dielectrics and Perfect Conductors", IEEE Transactions on Antennas and Propagation vol. 63, No. 8, Aug. 2015, United States, pp. 3599-3609.

Cordier et al., "A Data-Driven Approach for Real-Time Clothes Simulation", IEEE Computer Graphics Forum vol. 24, No. 2, 2005, United States, pp. 173-183.

Corredoura et al., "Millimeter-Wave Imaging System for Personnel Screening: Scanning 10ß7 Points a Second and Using No Moving Parts", Proceedings of the SPIE, vol. 6211, 2006, United States, 8 pages.

Courtney et al., "Using GPUs to Accelerate Installed Antenna Performance Simulations", Proceedings of the Antenna Applications Symposium, 2011, United States, 14 pages.

Dyson, "The Equiangular Spiral Antenna", IRE Transactions on Antennas and Propagation 7(2), Apr. 1959, United States, pp. 181-187.

Eggert et al., "Estimating 3-D Rigid Body Transformations: A Comparison of Four Major Algorithms", Machine Vision and Applications vol. 9, Nos. 5-6, 1997, Germany, pp. 272-290.

Eyal et al., "Three Dimensional Real Time Ultra-Wide Band Whole Body Imaging System", IEEE Radar Conference, May 7-11, 2012, United States, pp. 22-27.

Hantscher et al., "Security Pre-Screening of Moving Persons Using a Rotating Multichannel W-Band Radar", IEEE Transactions on Microwave Theory and Techniques vol. 60, No. 3, Mar. 2012, pp. 870-880.

Hokuyo Atomic Co., Ltd., "Distance Data Output/UTM-30LX-EW", available online at https://www.hokuyo-aut.jp/search/single.php?serial=170, 2014, accessed Sep. 17, 2018, 2 pages.

Honghao et al., "Preconditioned Gauss-Seidel Iterative Method for Linear Systems", IEEE International Forum on Information Technology and Applications (IFITA), May 2009, United States, pp. 382-385.

Horn, "Closed-Form Solution of Absolute Orientation Using Unit Quaternions", Journal of the Optical Society of America A vol. 4, No. 4, 1987, United States, pp. 629-642.

Kanazawa et al., "End-to-End Recovery of Human Shape and Pose", IEEE/CVF Conference on Computer Vision and Pattern Recognition, Jun. 2018, United States, pp. 7122-7131.

Kavan et al., "Geometric Skinning with Approximate Dual Quaternion Blending", ACM Transactions on Graphics vol. 27(4), 2008, United States, pp. 1-23.

Kee et al., "Efficient GPU Implementation of the High-Frequency SBR-PO Method", IEEE Antennas and Wireless Propagation Letters vol. 12, Jul. 2013, United States, pp. 941-944.

Keller et al., "Privacy Algorithm for Cylindrical Holographic Weapons Surveillance System", Pacific Northwest National Laboratory, IEEE Aerospace and Electronic Systems Magazine, Aug. 2002, United States, pp. 177-181.

Kozick et al., "Synthetic Aperture Pulse-Echo Imaging with Rectangular Boundary Arrays", IEEE Transactions on Image Processing vol. 2, No. 1, Jan. 1993, United States, pp. 68-79.

Ling et al., "Shooting and Bouncing Rays: Calculating the RCS of an Arbitrarily Shaped Cavity", IEEE Transactions on Antennas and Propagation vol. 37, Issue 2, Feb. 1989, United States, pp. 194-205.

Liu et al., "SSD: Single Shot MultiBox Detector", ECCV Lecture Notes in Computer Science vol. 9905, 2016, Germany, pp. 21-37.

Loper et al., "SMPL: A Skinned Multi-Person Linear Model", ACM Transactions on Graphics vol. 34(6), 2015, United States, 16 pages.

Magnenat-Thalmann et al., "Joint-Dependent Local Deformations for Hand Animation and Object Grasping", Graphics Interface, Jun. 1988, Canada, pp. 26-33.

Mao et al., "Ultrawideband Circularly Polarized Spiral Antenna Using Integrated Balun with Application to Time-Domain Target Detection", IEEE Transactions on Antennas and Propagation vol. 57, No. 7, Jul. 2009, United States, 1914-1920.

Mensa, "High Resolution Radar Cross-Section Imaging", Norwood, MA, Artech House, 1991, United States, 10 pages.

Moulder et al., "Development of a High-Throughput Microwave Imaging System for Concealed Weapons Detection", IEEE International Symposium on Phased Array Systems and Technology (PAST), Oct. 18-21, 2016, United States, 6 pages.

Moulder et al., "Mobile Testbed for Video-Rate Multistatic Microwave Imaging Array", IEEE International Symposium on Antennas and Propagation & USNC/URSI National Radio Science Meeting, 2018, United States, 2 pages.

(56) References Cited

OTHER PUBLICATIONS

Moulder et al., "Switched Antenna Array Tile for Real-Time Microwave Imaging Aperture", IEEE International Symposium on Antennas and Propagation (APSURSI), 2016, United States, 2 pages.

Newell et al., "Stacked Hourglass Networks for Human Pose Estimation", ECCV Lecture Notes in Computer Science vol. 9912, 2016, Germany, pp. 483-499.

Sheen et al., "Combined Illumination Cylindrical Millimeter-Wave Imaging Technique for Concealed Weapon Detection", Passive Millimeter-Wave Imaging Technology IV, Proceedings of SPIE vol. 4032, 2000, United States, pp. 52-60.

Sheen et al., "Cylindrical Millimeter-Wave Imaging Technique and Applications", SPIE Defense and Security Symposium, vol. 6211, 2006, United States, 11 pages.

Sheen et al., "Cylindrical Millimeter-Wave Imaging Technique for Concealed Weapon Detection", Proceedings of SPIE 26th AIPR Workshop: Exploiting New Image Sources and Sensors, Oct. 1997, United States, pp. 242-250.

Sheen et al., "Three-Dimensional Millimeter-Wave Imaging for Concealed Weapon Detection", IEEE Transactions on Microwave Theory and Techniques vol. 49, No. 9, Sep. 2001, United States, pp. 1581-1592.

Sheen et al., "High-Resolution 3D Microwave Imaging of a Moving Target Using Optical Motion Capture", Proceedings of SPIE Passive and Active Millimeter-Wave Imaging XXII, May 2019, United States, 11 pages.

Sheen et al., "Near-Field Three-Dimensional Radar Imaging Techniques and Applications", Applied Optics vol. 49, No. 19, Jul. 2010, United States, pp. E83-E93.

Sheen et al., "Wide-Bandwidth, Wide-Beamwidth, High-Resolution, Millimeter-Wave Imaging for Concealed Weapon Detection", SPIE Defense, Security, and Sensing Proceedings vol. 8715, Baltimore, Maryland, 2013, United States, 11 pages.

Sheen et al., U.S. Appl. No. 62/829,531, filed Apr. 4, 2019, titled "High-Resolution 3D Microwave Imaging of a Moving Target using Optical Motion Capture", 39 pages.

Sheen et al., U.S. Appl. No. 63/012,622, filed Apr. 20, 2020, titled "Footwear Scanning Systems and Associated Methods", 46 pages.

Sheen, "Sparse Multi-Static Arrays for Near-Field Millimeter-Wave Imaging", IEEE Global Conference on Signal and Information Processing (GlobalSIP), Dec. 2013, United States, pp. 699-702.

Sick, "2D LiDAR Sensors", available online at https://www.sick.com/us/en/detection-and-ranging-solutions/2d-lidar-sensors/c/g91900, Sep. 17, 2018, 6 pages.

Slattery, "Use of Mills Cross Receiving Arrays in Radar Systems", IEEE Proceedings vol. 113, No. 11, Nov. 1966, United States, pp. 1712-1722.

Tedeschi et al., "Ultra-Broadband Voltage-Controlled Oscillator Linearization for Frequency Modulated Continuous Wave MMW Imaging Systems", SPIE Proceedings vol. 11742, Radar Sensor Technology XXV, Apr. 2021, United States, 8 pages.

Velodyne LiDAR, "HDL-64E", 2018, accessed Sep. 17, 2018, available online at https://velodynelidar.com/hdl-64e.html, 2 pages.

Wareham et al., "Bone Glow: An Improved Method for the Assignment of Weights for Mesh Deformation", AMDO Lecture Notes in Computer Science vol. 5098, 2008, Germany, pp. 63-71.

Yurduseven et al., "Design and Simulation of a Frequency-Diverse Aperture for Imaging of Human-Scale Targets", IEEE Access vol. 4, 2016, United States, pp. 5436-5451.

* cited by examiner

FIG. 5

IMAGING SYSTEMS AND IMAGING METHODS

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to imaging systems and imaging methods.

BACKGROUND OF THE DISCLOSURE

Screening of personnel for concealed weapons has become increasingly important as threats to aviation and other public venues, such as public arenas and courthouses, have evolved. The security posture at airports has been driven by high-profile events. Screening systems have been primarily directed towards detecting objects, such as weapons, explosives, etc. which are concealed upon and under clothing of individuals. Initial security focus was directed to detecting concealed handguns and knives and metal detectors for passenger screening and x-ray systems for hand-carried baggage and items were largely enough to mitigate threats.

Radar imaging technology using microwave and millimeter-wave (MMW) electromagnetic energy has been shown to detect concealed weapons of individuals because these signals are able to penetrate common clothing materials and are amenable to precise mathematical focusing techniques. However, microwave and MMW image reconstruction including mathematically focusing data is very computation intensive. Methods using faster reconstruction speeds enable lower latency and/or higher resolution but also may result in non-ideal artifacts in the results.

At least some of the aspects of the disclosure are directed to imaging systems and methods that have increased computational efficiency compared with some conventional systems and methods. According to some aspects described herein, radar data is focused at different resolutions to increase the speed of the focusing while maintaining optimal fidelity of generated images. Additional aspects of the disclosure are discussed in the example embodiments below.

BRIEF DESCRIPTION OF THE DRAWINGS

Example embodiments of the disclosure are described below with reference to the following accompanying drawings.

FIG. 5 is an illustrative representation of an antenna system according to one embodiment.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

The reader's attention is directed to a US Patent Application filed on the same date as this patent application, titled "Imaging Systems and Imaging Methods", naming Richard Trevor Clark and David M. Sheen as inventors, and the teachings of which are incorporated by reference herein and which discloses example imaging systems and methods for processing and focusing radar data. The reader's attention is also directed to a US Patent Application filed on the same date as this patent application, titled "Imaging Systems and Imaging Methods", naming David M. Sheen, A. Mark Jones, Jonathan R. Tedeschi, Richard Trevor Clark, Maurio B. Grando and Ryan C. Conrad as inventors, the teachings of which are incorporated by reference herein and which discloses example unit cells, antenna arrays, and multicolumn antenna architectures.

Some aspects of the disclosure are directed towards apparatus, systems and methods for detecting weapons or other objects which may be concealed, for example under clothing of a person or within other objects. At least some of the described imaging systems and methods may be utilized in varied applications to scan a three-dimensional (3D) target imaging volume including a person and generate radar images of scatterers within the target imaging volume as a result of the scanning. The generated images may be used to detect concealed weapons or objects.

Figure 1:
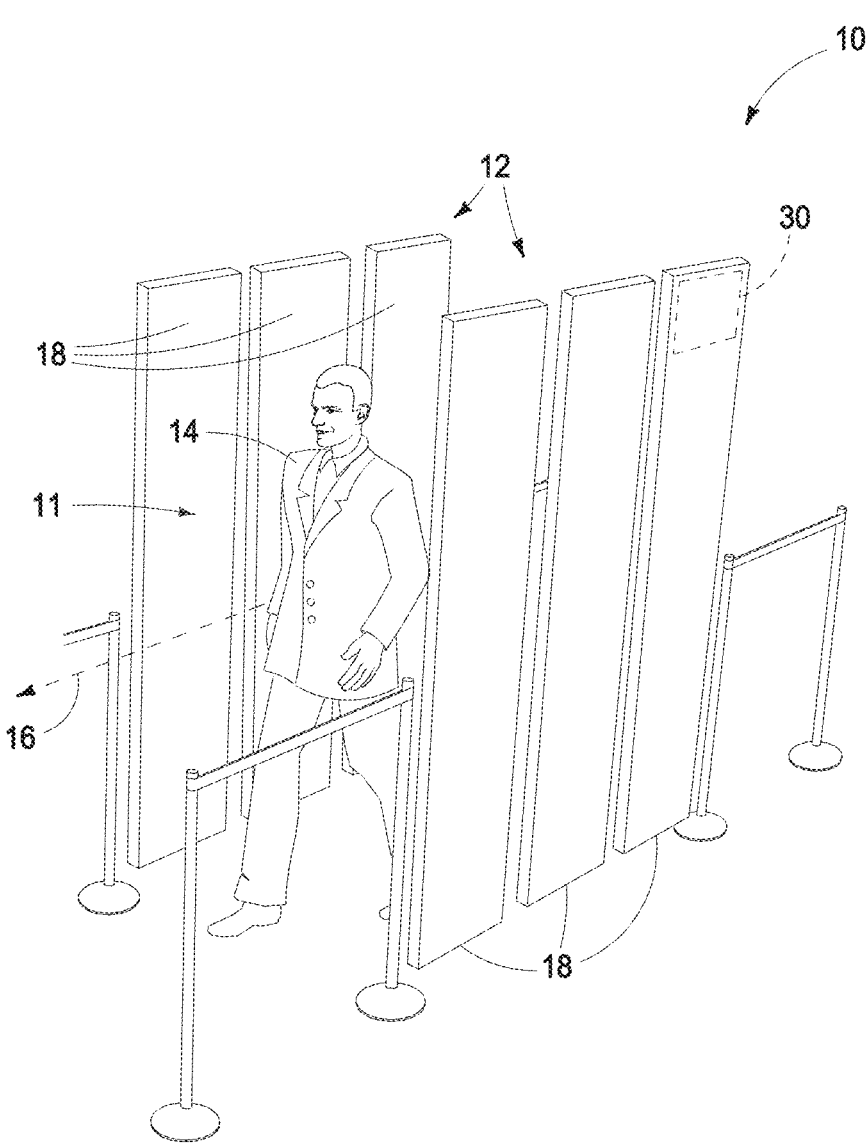
FIG. 1 is an illustrative representation of an imaging system according to one embodiment.

Referring to FIG. 1, an example imaging system 10 is shown according to one embodiment. The system 10 may be installed in one example application to provide threat detection at points of ingress/egress of a public facility. The depicted example imaging system 10 includes plural antenna systems 12 that are positioned opposite one another about a target imaging volume 11. In one embodiment, each antenna system 12 has a width of approximately 1.3 m and a height of 2.0 m. In the depicted configuration, the antenna systems 12 are oriented facing each other at a separation distance of approximately 1.5 m.

Each of the antenna systems 12 includes a plurality of antenna arrays 18. The antenna arrays 18 are configured as columns in the depicted antenna system 12 having a multi-column architecture. The antenna arrays 18 each include a plurality of transmit antennas that are configured to emit electromagnetic energy towards target imaging volume 11 and a plurality of receive antennas that are configured to receive electromagnetic energy reflected from scatterers within the target imaging volume 11 during scanning and imaging operations (the transmit and receive antennas are not shown in FIG. 1).

Figure 3:
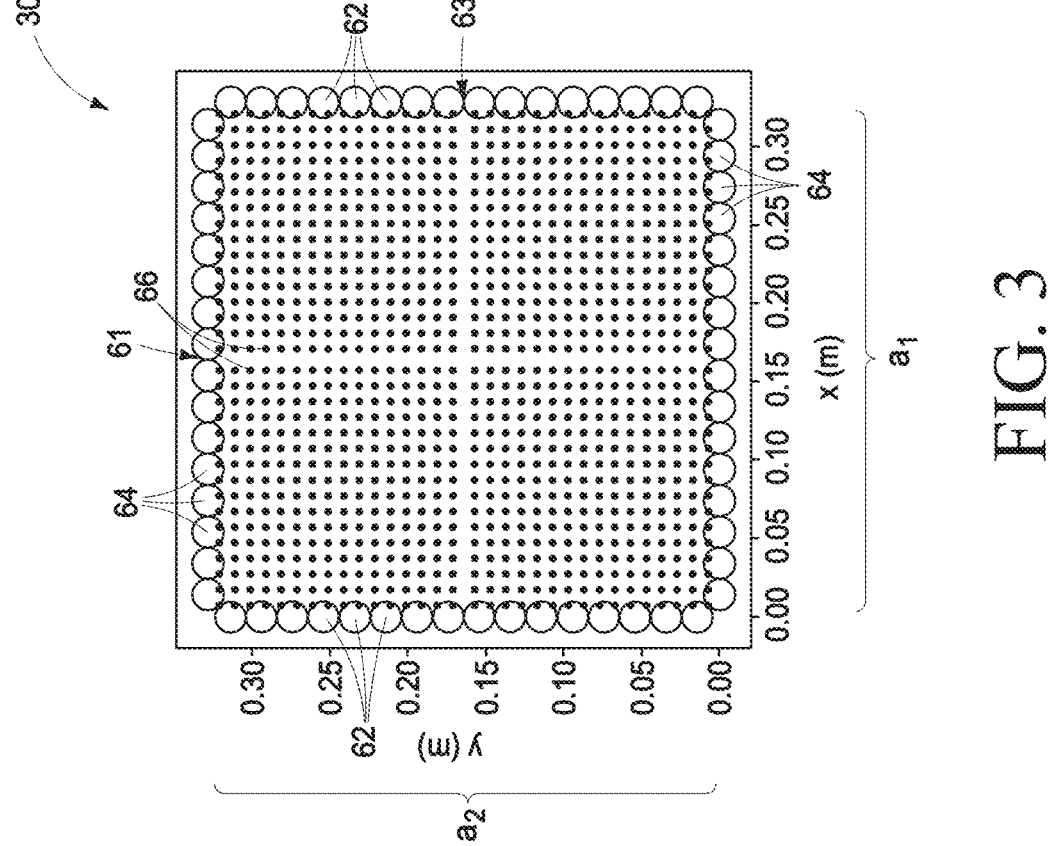
FIG. 3 is an illustrative representation of a unit cell according to one embodiment.

In one embodiment, each of the arrays 18 incudes a plurality of unit cells 30. In one more specific embodiment, each antenna array 18 includes six unit cells 30 that are arranged vertically where the unit cells 30 are positioned elevationally above one another along the vertical extent of the respective antenna array 18. Additional details of an example unit cell 30 are shown in FIG. 3 and discussed below. Other arrangements for implementing transmit and receive antennas of the antenna system 12 are possible, for example including only one array system 12 or different numbers of arrays 18 or unit cells 30 of transmit and receive antennas that may be arranged in other configurations such as horizontally. Additional details regarding operations of the antenna system 12 during scanning are discussed below.

A person 14 to be screened enters the imaging system 10 which attempts to detect the presence of concealed objects, such as weapons or explosives, upon the person 14 as they walk in a direction 16 through the target imaging volume 11 or stand within volume 11. The antenna systems 12 each emit electromagnetic energy towards the person 14 in the target imaging volume 11 and receive electromagnetic energy reflected from the person 14.

As discussed below, the received electromagnetic energy may be focused to provide information regarding one or more items that may be concealed upon the person 14. The results of the electromagnetic scanning and focusing may be used in one or more ways, such as the generation of images of the target imaging volume including the person 14. The images may be displayed via a computer monitor, processed using automated threat detection or artificial intelligence, and/or stored for subsequent processing and use in example implementations. The use of two antenna systems 12 permits scanning of two sides of the person 14 as the person 14 moves through, or stands within, the imaging system 10 and the target imaging volume 11.

In some embodiments, the two systems 12 transmit at slightly different times or frequencies to reduce interference therebetween. The transmit/receive channels on a single system 12 may be sequenced to only have one transmitter active at a time with one or more simultaneous receivers. In one other embodiments, the transmitters may be sequenced to minimize or eliminate interference through spatial and/or time multiplexing.

In the described example embodiment, the antenna systems 12 are stationary and do not move during scanning operations. Each of the antenna systems 12 are configured to scan a two-dimensional (2D) aperture to implement multi-static scanning of the target imaging volume 11 where different combinations of transmit and receive antennas are selected to emit and receive electromagnetic energy at different moments in time. The transmit and receive antennas are selected at different moments in time to provide raster scanning of a plurality of different sampling points across substantially the entire 2D aperture during the scanning as discussed further below.

In other embodiments, an antenna array may be physically moved to scan a 2D aperture during scanning operations, for example as discussed in U.S. patent application Ser. No. 17/959,890, filed Oct. 4, 2022, titled "Imaging Systems and Associated Methods", having inventors David M. Sheen and Richard Trevor Clark, the teachings of which are incorporated herein by reference.

Figure 2:
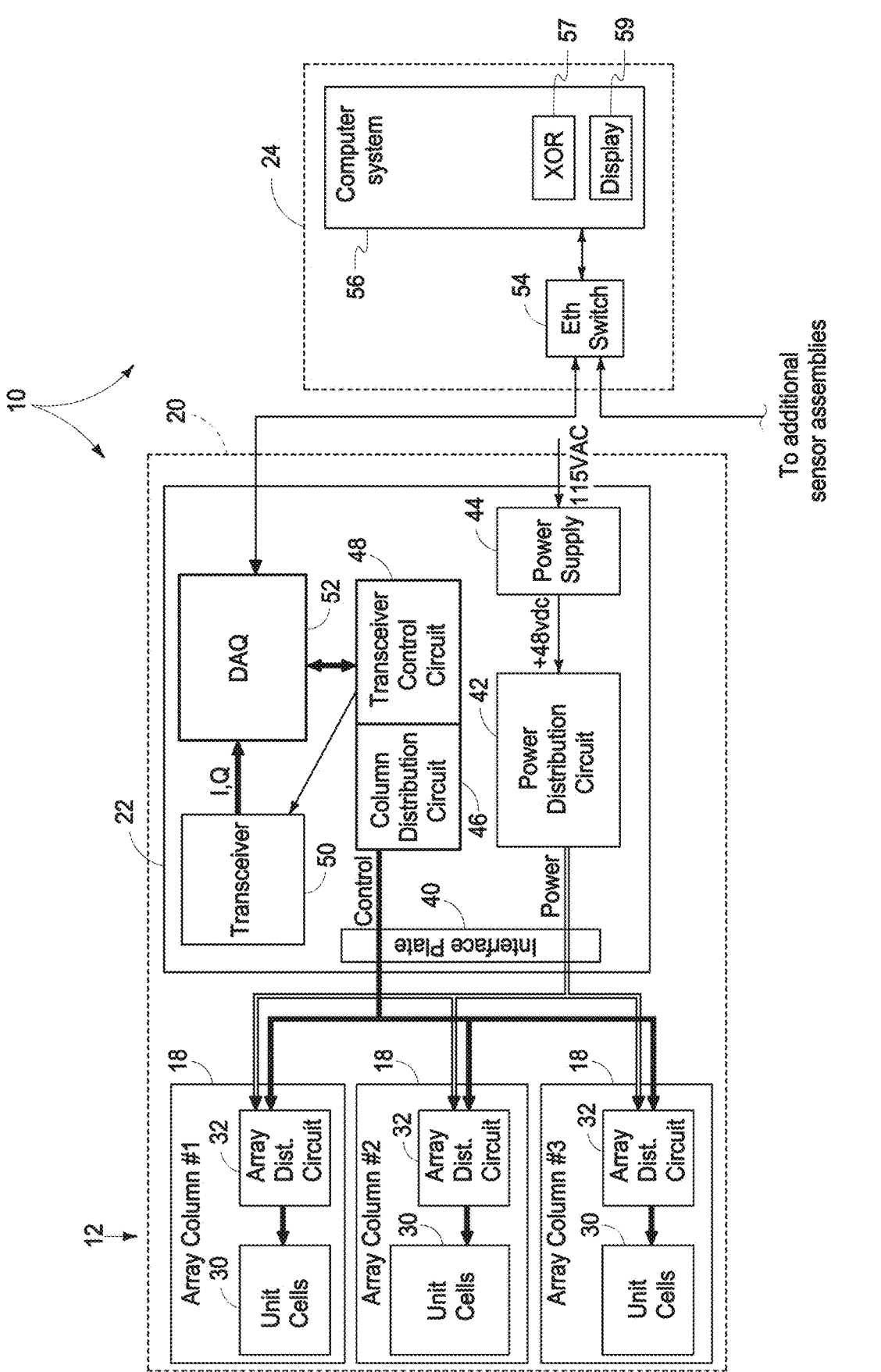
FIG. 2 is a block diagram of components of an imaging system according to one embodiment.

Referring to FIG. 2, a functional block diagram of components of an example embodiment of imaging system 10 are shown. The illustrated imaging system 10 includes one or more sensor assemblies 20 (each including one of the antenna systems 12) and an operator work station 24 in the illustrated embodiment. The depicted sensor assembly 20 includes plural array arrays 18 of the antenna system 12 and an associated electronics system 22 as shown.

The individual arrays 18 include a plurality of unit cells 30 and an array distribution circuit 32. The array distribution circuit 32 routes RF transmit and receive channels to desired transmit and receive antenna combinations of the respective unit cell 30.

Electronics system 22 includes an interface plate 40, a power distribution circuit 42, a power supply 44, a column distribution circuit 46, a transceiver control circuit 48, a transceiver 50, and a data acquisition system (DAQ) 52.

Interface plate 40 provides a bulkhead for electrical connections between the electronics system 22 and the antenna arrays 18 and provides operational power from power distribution circuit 42 and power supply 44 to antenna arrays 18. In addition, interface plate 40 communicates control signals from column distribution circuit 46 to antenna arrays 18 to control the transmission of electromagnetic energy from the antenna arrays 18 and receives signals from the antenna arrays 18 corresponding to reflections of electromagnetic energy from the target imaging volume.

Power distribution circuit 42 receives operational electrical energy from power supply 44 and distributes the electrical energy at appropriate voltages to the antenna arrays 18 via interface plate 40. Power supply 44 receives AC electricity (e.g., 115 VAC) and outputs DC electricity (e.g., +48 VDC) to power distribution circuit 42.

Column distribution circuit 46 may be referred to as a controller and includes logic to select different pairs of transmit and receive antennas of the antenna arrays 18 to provide a plurality of different sampling points within the imaging aperture during scanning operations. Transceiver control circuit 48 is configured to control operations of transceiver 50 including the generation and application of signals therefrom to the transmit antennas to emit electromagnetic energy from the antenna arrays 18.

Some embodiments of the imaging system are based upon a frequency modulated continuous wave (FMCW) voltage-controlled oscillator (VCO) driven transceiver architecture. For example, transceiver control circuit 48 controls the transceiver 50 to control the transmission or emission of electromagnetic energy in a sweep of a desired frequency range capable of penetrating clothing to identify concealed items in one embodiment. The transmitted electromagnetic energy is within a frequency range of 3-300 GHz. In one more specific example, the transmitted signal is swept through a bandwidth of about 10 GHz to about 40 GHz for each of a plurality of combinations of the transmit and receive antennas corresponding to respective effective sampling points of the aperture. In other embodiments, the emitted electromagnetic energy is swept through a tighter bandwidth of 10-20 GHz. Other frequency ranges may be used in other embodiments.

Transceiver 50 outputs signals to the transmit antennas to control the emission of electromagnetic energy from the antenna arrays 18 and receives signals from the receive antennas that are indicative of electromagnetic energy received via the antenna arrays 18. Transceiver 50 processes the received signals to provide I, Q outputs to data acquisition system (DAQ) 52 that are indicative of the reflections of the electromagnetic energy received by the receive antennas.

Data acquisition system 52 samples the I, Q signals from the transceiver 50 and outputs digitized samples of the I, Q signals to operator work station 24. The samples outputted from DAQ 52 may be referred to as radar data that are processed by operator workstation 24.

Operator workstation 24 includes an Ethernet switch 54 that implements communications of the workstation 24 with one or more sensor assemblies 20. Workstation 24 additionally includes a computer system 56 that is configured to process outputs from the sensor assemblies 20 including implementing processing operations to focus the radar data received from the sensor assemblies 20. Backprojection is used in some embodiments to focus the radar data and details regarding backprojection focusing at a plurality of different resolutions according to some aspects of the disclosure are described below.

Computer system 56 includes processing circuitry 57 in the illustrated embodiment. Processing circuitry 57 processes the radar data to provide information regarding objects which may be concealed, for example beneath clothing of the individual in the target imaging volume, as discussed in further detail below. In one embodiment, processing circuitry 57 focuses the radar data resulting from the scanning of the target imaging volume to generate images of the volume. The generated images may be displayed, processed, for example by threat detection processing methods, artificial intelligence, and/or stored using storage circuitry (not shown). In some embodiments, the processing circuitry 57 generates a plurality of video images at a given frame rate in real time.

Processing circuitry 57 may comprise circuitry configured to implement programming in at least one embodiment. For example, the processing circuitry 57 may be implemented as one or more processor(s) and/or other structure configured to execute executable instructions including, for example, software and/or firmware instructions. Other example embodiments of processing circuitry 57 include hardware logic, GPU, FPGA, ASIC, state machines, and/or other structures alone or in combination with one or more processor(s). These examples of processing circuitry 57 are for illustration and other configurations are possible.

The focusing of the radar data indicative of electromagnetic energy that is reflected from the target imaging volume creates radar images of the target imaging volume. Some embodiments of computer system 56 include a display 59 that is configured to generate visual representations of the images. In other embodiments, the images are processed by artificial intelligence, processed using automated threat detection, and/or stored for subsequent processing without display of the images.

In one example, computer system 56 is implemented as a Ubuntu 18 computer workstation paired with an Atipa Visione SX426-24G10 dual-socket Xeon GPU server that utilizes six high-end Nvidia GPUs for image processing. The GPU server is housed within a soundproof enclosure for an improved operator experience in some embodiments.

Referring to FIG. 3, one embodiment of a unit cell 30 that may be used in an array 18 is shown. In one implementation, six of the illustrated cells 30 are elevationally stacked in a vertical arrangement above one another to form each of the arrays 18 shown in FIG. 1. Other configurations of the unit cells 30 may be used in other embodiments.

The illustrated unit cell 30 has a plurality of antennas that are separated from one another. In the depicted embodiment, the unit cell 30 is a two-dimensional (2D) antenna array or sub-array having a plurality of transmit antennas 62 and a plurality of receive antennas 64 arranged in a boundary array configuration. Transmit antennas 62 are configured to emit electromagnetic energy towards a target imaging volume and the receive antennas 64 are configured to receive reflections of the electromagnetic energy from the target imaging volume and to output electrical signals corresponding to the electromagnetic energy received by the receive antennas 64.

In the illustrated boundary configuration of unit cell 30, the transmit and receive antennas 62, 64 are provided at a perimeter of the unit cell 30 having a rectangular shape and the perimeter defines a 2D aperture of the unit cell 30. More specifically, the transmit (T) antennas 62 are arranged in vertical subarrays that are positioned at opposing vertical left and right sides of the cell 30 and receive (R) antennas 64 are arranged in horizontal subarrays that are positioned at opposing top and bottom sides of the unit cell 30.

The unit cell 30 is a sparse multistatic array where different combinations of transmit and receive antenna pairs are selected at different moments in time to transmit and receive electromagnetic energy to provide a plurality of respective different virtual effective sampling points 66 at internal locations within the boundary or perimeter of the unit cell 30 corresponding to the 2D aperture of the unit cell 30. The 2D aperture has a first axis $a_1$ that corresponds to the horizontal extent of the sampling points 66 of the aperture and a second axis $a_2$ that corresponds to the vertical extent of the sampling points 66 of the aperture.

The use of selected transmit and receive antenna pairs 62, 64 of the described unit cells 30 enables dense and effective sampling of the 2D aperture while requiring relatively few antennas compared to a fully populated two dimensional antenna array. The sampling points 66 are located at approximately midpoints between the selected transmit and receive antenna pairs. The provision of linear arrays of transmit antennas 62 vertically and linear arrays of receive antennas 64 horizontally provides effective sampling points 66 that span a uniform rectangular region of the aperture in the depicted embodiment.

In one embodiment, electromagnetic energy is emitted at plural frequencies of a desired frequency sweep for each of the pairs of transmit and receive antennas 62, 64 and the reflections of electromagnetic energy having the different frequencies are received and processed for each of the sampling points 66 corresponding to the pairs of transmit and receive antennas 62, 64.

In one embodiment, all of the possible different pairs of transmit and receive antennas 62, 64 of the unit cell 30 are selected to provide sampling points 66 across at least substantially the entirety of the 2D aperture of the respective unit cell 30 for scanning of an image or video frame. According to one example method of selecting pairs of transmit and receive antennas, at the initiation of scanning of an image or video frame, a first transmit antenna 62 may be selected to emit the frequency sweep of electromagnetic energy for each of the receive antennas 64 of the unit cell 30. Thereafter, a second transmit antenna 62 is selected to emit the frequency sweep of electromagnetic energy for each of the receive antennas 64 and this process is repeated until all possible pairs of transmit and receive antennas 62, 64 have been selected and responses obtained for each of the sampling points 66 of the unit cell 30. The effective sampling points 66 are raster scanned in the area inside the boundary of the unit cell 30 in the illustrated embodiment.

In one more specific scanning example, the transmit antenna 62 located in the bottom left corner of a unit cell 30 is selected and emits a frequency sweep of electromagnetic energy a plurality of times (i.e., one frequency sweep is emitted from the selected transmit antenna 62 for each receive antenna 64 in the unit cell 30). In this described example, the receive antennas 64 located in the bottom row of the unit cell 30 are sequentially selected from left to right to receive the emitted frequency sweeps from the selected transmit antenna 62. This sequential selection process is repeated for the receive antennas 64 located in the top row of the unit cell 30 to receive the emitted frequency sweep from the selected transmit antenna 62. Following all of the receive antennas 64 receiving an emitted frequency sweep from the transmit antenna 62 located in the bottom corner, the next transmit antenna 62 above the bottom left corner is selected to emit a plurality of frequency sweeps to be received by the receive antennas 64 in the top and bottom of the unit cell 30 that are selected one-by-one as mentioned above. Following transmission of the frequency sweeps from the transmit antennas 62 located on the left of the unit cell 30, the above-described process is repeated for the transmit antennas 62 located on the right of the unit cell 30. This example scanning method generates the effective sampling points 66 for the unit cell 30 that are substantially uniformly spaced at substantially the same distance from one another and at locations across substantially an entirety of the 2D aperture of the unit cell 30 as shown in FIG. 3. As discussed further below with respect to FIGS. 11-12A, a vertical gap 61 and a horizontal gap 63 within the 2D aperture of the unit cell 30 are shown due to a design assumption that the antennas require a minimum physical separation distance from one another (e.g., antennas are separated by a distance of 20 mm).

The example antenna boundary array configuration of FIG. 3 allows for extremely dense sampling and thus provides superb image quality without use of a mechanically scanned aperture nor any motion tracking technology.

The apertures of multiple unit cells 30 may be combined to define larger 2D apertures of the antenna system 12, for example combining the 2D apertures of six vertically arranged unit cells 30 to form a larger 2D aperture of an antenna array 18 or antenna system 12 of the embodiment shown in FIG. 1 and as discussed below with respect to FIG. 5.

Figure 4:
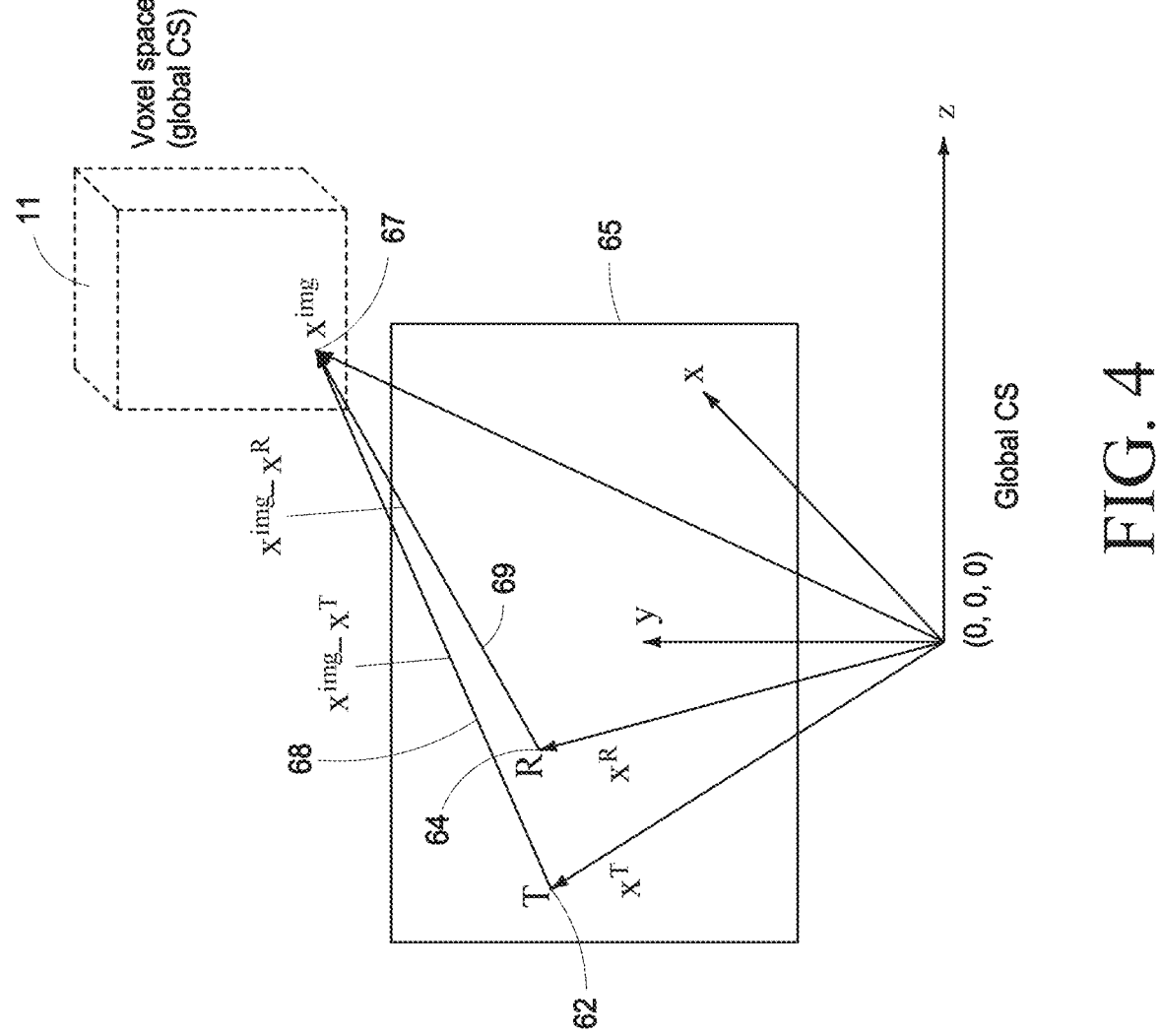
FIG. 4 is an illustrative representation of a multistatic scanned aperture imaging system according to one embodiment.

Referring to FIG. 4, an illustrative representation is shown of scanning operations where transmit and receive antennas of antenna system are electronically scanned over a two-dimensional 2D multistatic aperture 65 that may be formed by one or more unit cells 30. A global coordinate system (global CS) is used for backprojection focusing and the coordinate system of the voxel space or target imaging volume 11 is used as the global coordinate system in one embodiment.

Although a transmit antenna 62 and a receive antenna 64 of one pair are shown in FIG. 4, it is understood that additional different pairs of transmit and receive antennas of the antenna system are selected to transmit electromagnetic energy towards target imaging volume 11 and receive electromagnetic energy reflected from volume 11 at different times. The selection of different pairs of transmit and receive antennas 62, 64 at different times for scanning results in a plurality of sampling points 66 over at least substantially an entirety of the multistatic aperture 65.

In one embodiment, a target may be either stationary within or moving through target imaging volume 11 as different pairs of transmit and receive antennas are scanned. One of a plurality of voxels 67 (i.e., $x^{img}$) is shown receiving electromagnetic energy 68 from transmit antenna 62 of a selected pair of antennas and reflecting electromagnetic energy 69 to receive antenna 64 of the selected pair of antennas.

The selection of different antenna arrays during scanning provides the scanned aperture 65 which includes different transmit and receive combinations of the antennas of the antenna arrays 18 whose effective phase centers (i.e., effective sampling points) span the extent of the aperture 65 as mentioned above.

The discussion proceeds below with respect to example operations performed by the processing circuitry of workstation 24 with respect to the radar data to perform range-domain multistatic backprojection focusing to generate images of a target imaging volume. In one embodiment, the processing circuitry of the imaging system accesses and processes the radar data using backprojection 3D image reconstruction. As discussed in US Patent Publication No. 2020/0319331 A1, the teachings of which are incorporated herein by reference, one parameter to perform back-projection focusing of the reconstruction is the effective range from a selected pair of transmit and receive antennas to a given image voxel of the target imaging volume, which is defined here as one-half the round-trip distance. For a single voxel, a frequency-domain back-projection algorithm can be expressed as:

$$v(x^{img}) = \sum_{\substack{aperture \\ \{a_1, a_2\}}} w(a_1, a_2) \sum_f S(a_1, a_2, f) e^{j2kr} \qquad \text{Eq. 1}$$

where $v(x^{img})$ is the complex image amplitude or intensity at an image position or voxel $x^{img}$ of the target imaging volume 11, $S(a_1, a_2, f)$ is the complex radar phase-history data collected over aperture dimensions $a_1$, $a_2$ and f is frequency. An aperture weighting term $w(a_1, a_2)$ is used here to provide amplitude weighting of calculated intensities of the voxels to reduce side lobes or other artifacts in the image and which is discussed in further detail below. Additional details regarding example aperture weighting terms that may be used are discussed below with respect to FIGS. 11-13. Note that S and w are both typically discrete multidimensional arrays rather than continuous functions in one embodiment. The conjugate phase term in this expression is $e^{j2kr}$ where $k=2\pi f/c$, c is the speed of light, and $$r = \left( \left| x^{img} - x^T \right| + \left| x^{img} - x^R \right| \right)/2 \qquad \text{Eq. 2}$$

In this expression, $x^T$ is the location of the transmitting antenna upon the antenna array and $x^R$ is the location of the receiving antenna upon the antenna array, $x^{img}$ is the image voxel location of the target imaging volume, and the round-trip distance is divided by 2 so that the range (r) is an equivalent or effective one-way distance to the voxel of the target from a selected pair of the transmit and receive antennas. This is done for consistency with monostatic or quasi-monostatic radar systems.

For 3D imaging, the above processing has a computational burden of $O(N^6)$ upon the processing circuitry where N is the nominal dimension of each axis of the voxel space, frequency, and aperture dimensions.

As is further discussed in US Patent Publication No. 2020/0319331 A1, the order of the process can be reduced to $O(N^5)$ by transforming the radar data from the frequency domain to the range domain and as also discussed described below. In the described embodiment, the radar data has a complex image amplitude or intensity v ($x^{img}$) at an image position or voxel $x^{img}$ of the range domain back-projection expressed in Eq. 3.

As also discussed in US Patent Publication No. 2020/0319331 A1, there is a fast phase variation of $e^{j2k_c r}$ where $k_c(k_1+k_2)/2$ is the center wavenumber and $k_2=2\pi f_{stop}$ is the final wavenumber since the range response is queried during summation using interpolation and this phase variation may lead to errors or require that the range response be overly finely sampled. This variation can be largely removed by demodulating the data with a $e^{-j2k_c r}$ term and subsequently remodulating the data with a $e^{j2k_c r}$ term. The complex image amplitude or intensity v ($x^{img}$) at an image position or voxel $x^{img}$ of the range domain back-projection can be expressed as $$v\left(x^{img}\right) = \sum_{a_1}\sum_{a_2} w(a_1, a_2)s(a_1, a_2, r)e^{j2k_c r} \qquad \text{Eq. 3}$$

where $$s(a_1, a_2, r) = \left\{iFFT_f(S(a_1, a_2, f))e^{j2k_1 r_n}e^{-j2k_c r_n}\right\} \qquad \text{Eq. 4}$$

is the demodulated range response computed by performing an iFFT of the phase history on the frequency axis, applying a phase term of $e^{j2k_1 r}e^{-j2k_c r}$ and using interpolation (usually linear) to compute the value at range r, which is $$r = \left(\left|x^{img} - x^T\right| + \left|x^{img} - x^R\right|\right)/2 \qquad \text{Eq. 5}$$

The complete image is formed by evaluating Eq. 3 over the full 3D set of voxel locations and the overall order of the computation performed by the processing circuitry 57 is reduced from $O(N^6)$ to $O(N^5)$.

In one embodiment, locations and orientations of the transmitters and receivers of one or more unit cells of the antenna system are defined in an array path sequence file shown in Table A. This array has $N^{TR}$ rows, which is the number of different combinations of transmit and receive antennas, or elements, in the array. The disclosed array path sequence file is used to keep track of the transmit and receive antenna positions (e.g., x, y, z) and orientations (e.g., unit vectors with x, y, z components) for each virtual sampling point of the aperture. The inclusion of the information regarding the transmit and receive antennas in an array path sequence file is convenient as information regarding the sampling points is used many times during the processing and focusing of the radar data.

TABLE A

| Array Path Sequence (APS) File | |
| --- | --- |
| Column | Description |
| 0 | TR index number |
| 1 | T index |

TABLE A-continued

| Array Path Sequence (APS) File | |
| --- | --- |
| Column | Description |
| 2:5 | T position (x, y, z) |
| 5 | R index |
| 6:9 | R position (x, y, z) |
| 9:12 | Phase Center (midpoint of T and R) (x, y, z) |
| 12:15 | T orientation vector ($n_x$, $n_y$, $n_z$) |
| 15:19 | R orientation vector ($n_x$, $n_y$, $n_z$) |

Additional imaging systems and imaging methods are described below with respect to FIGS. 5-10B. At least some aspects of the disclosure herein pertain to switched array modules and imaging systems that utilize switched array modules. In some embodiments described below, the switched array modules are implemented as printed circuit board (PCB) linearly oriented array modules. The switched array modules may be arranged to form the above-described unit cells of FIG. 3 where one switched array module forms one side of the unit cell in the form of a rectangular boundary array. The switched array modules and unit cells may be used to form the basis for a wide variety of imaging system configurations, including large aperture rectangular arrays and quasi-cylindrical arrays as illustrated in some example embodiments below.

One embodiment of the switched array modules utilizes integrated surface mount technology (SMT) switching and amplification circuitry so that a single switched array module includes all the antenna elements and signal distribution to form an edge of a boundary array unit cell. According to one embodiment, the switched array modules include edge-fed circular-polarized antenna elements that radiate or transmit electromagnetic energy broadside to an upper planar surface of the module. The switched array modules and unit cells may be easily incorporated into larger array designs because the integrated switching and amplification of at least one arrangement of the modules reduces the number of connections utilized for N antennas to a single microwave connector and a single digital/power connector for each edge of a boundary array.

Figure 5:
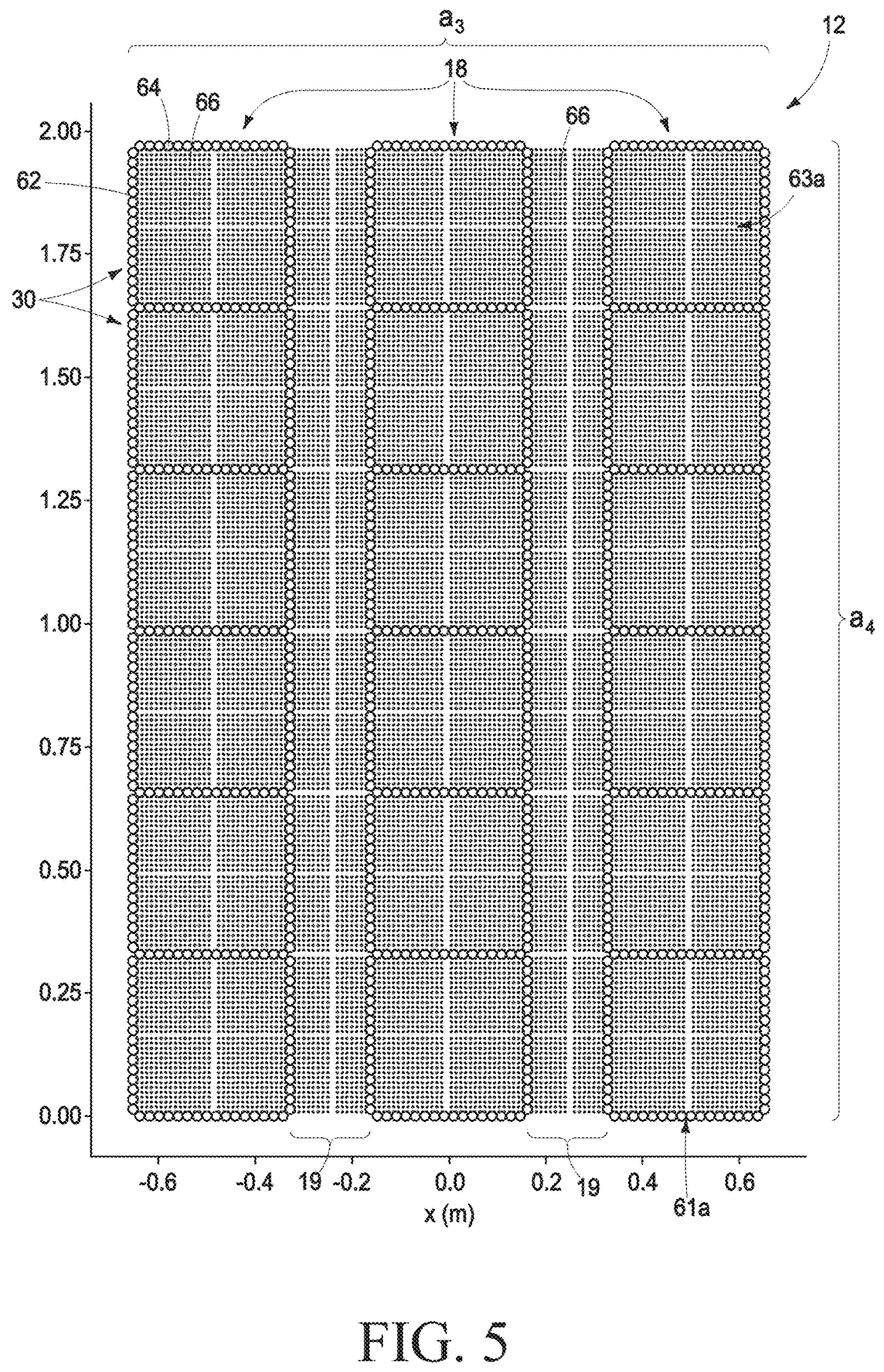

Referring to FIG. 5, one embodiment of a modular multi-column architecture of antenna system 12 of FIG. 1 is shown. The depicted antenna system 12 includes three relatively narrow column antenna arrays 18 that are spaced from one another and are coherently combined to form an arbitrarily large array. Coherent combination of the antenna arrays 18 according to some embodiments of the disclosure provides effective sampling points 66 in spaces 19 between the column arrays 18 thereby forming an aperture for the entire antenna system 12 that is larger than the areas of the arrays 18 and having a first axis as and a second axis $a_4$.

In the depicted embodiment, each of the antenna arrays 18 includes a plurality of transmit and receive antennas located at a perimeter of a given antenna array 18 and the coherent combination of the antenna arrays 18 allows sampling at effective sampling points 66 that are located external or outside of the perimeters of all the antenna arrays 18 (i.e., sampling points 66 are also provided within spaces 19 that are intermediate or between the antenna arrays 18) as well as at sampling points 66 that are internal of the antenna arrays 18. In the described embodiment, the antenna arrays 18 have a combined surface area, and the aperture of the antenna system 12 defined by axes $a_3$, $a_4$ has a surface area that is larger than the combined surface areas of the antenna arrays 18.

Figure 5A:
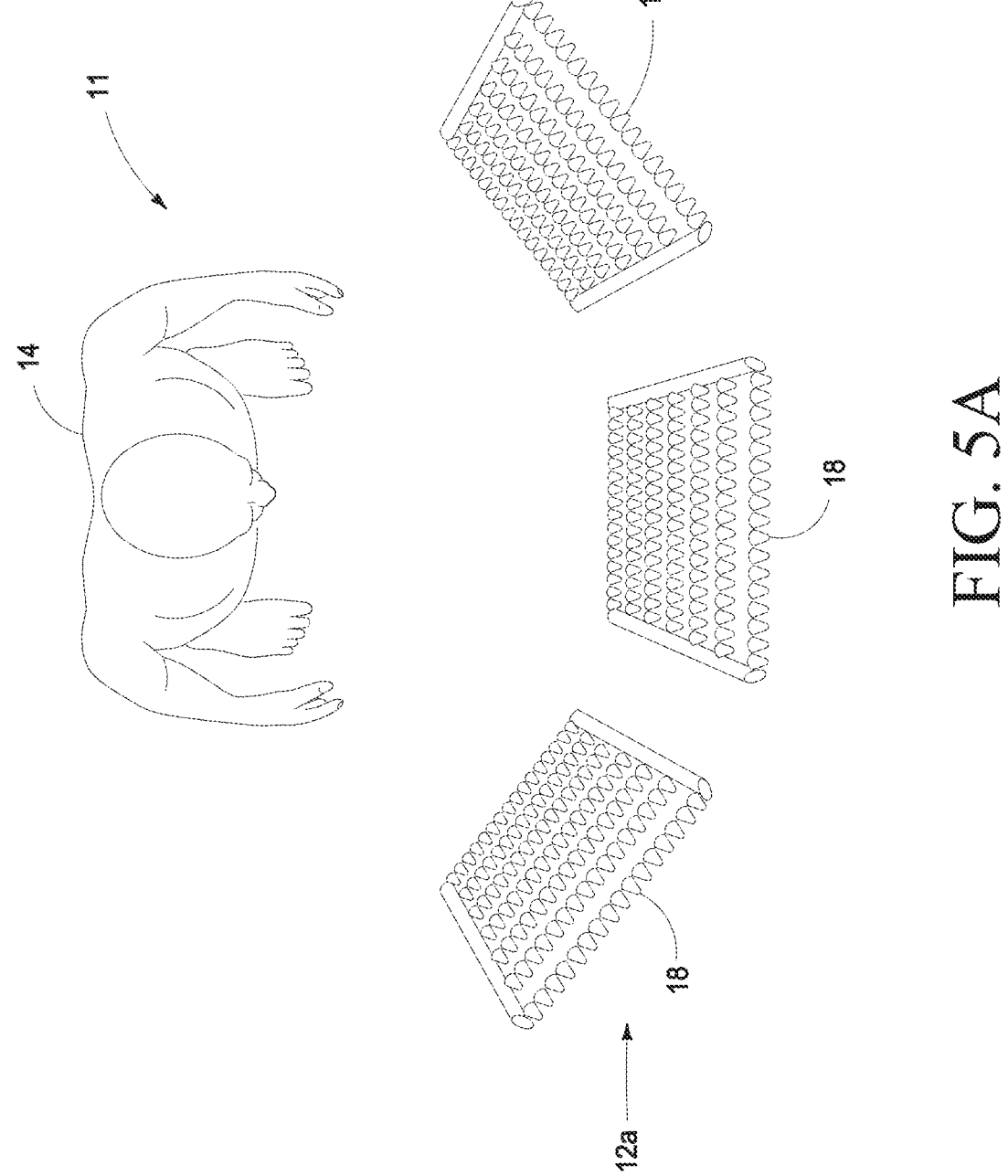
FIG. 5A is a plan view of an antenna system configured in a quasi-cylindrical arrangement according to one embodiment.
Figure 6A:
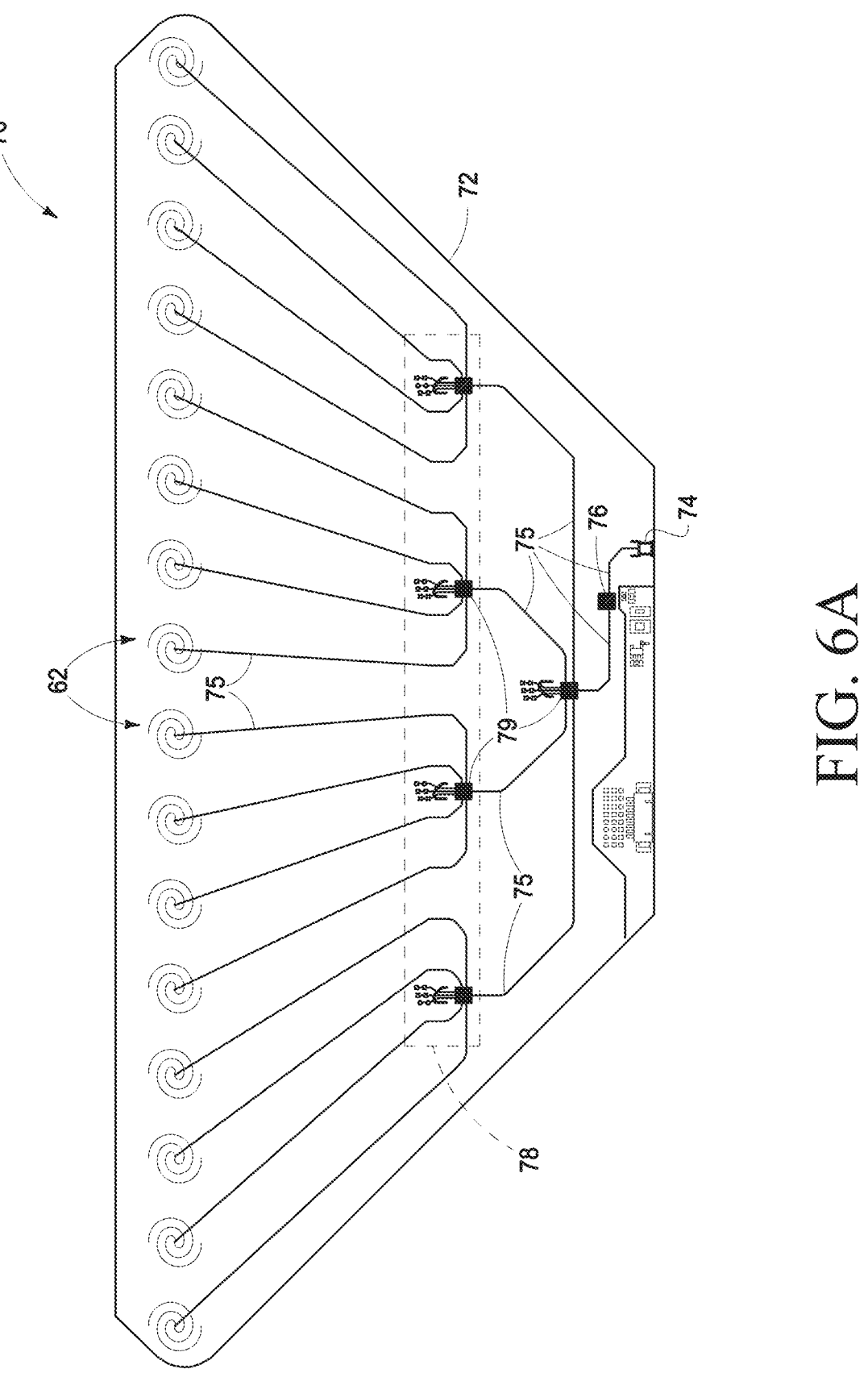
FIGS. 6A and 6B are illustrative representations of a transmit switched array module and a receive switched array module, respectively, according to example embodiments.

Different values of spacing 19 between antenna arrays 18 may be used in different embodiments. In some embodiments, spacing 19 is set to an integer multiple of the effective sample spacing within a unit cell 30 (e.g., one-half of the antenna spacing). In one more specific embodiment, spacing 19 between antenna arrays 18 is equal to N sample spacings, where N is the number of antennas in a single antenna module that defines each unit cell 30 (example antenna modules 70, 70a are shown in FIGS. 6 and 6A and discussed below). In the embodiment shown in FIG. 5, the array modules 70 have N=16 antenna elements spaced at 2.0 cm, sampling points 66 are spaced nominally at 1.0 cm, and the antenna arrays 18 are separated by 16 cm. This example spacing 19 provides that the maximum separation between transmit and receive antennas for sampling points 66 between the arrays 18 is no larger than that for sampling points 66 within unit cells 30 of a given antenna array 18.

In one embodiment, coherent combination of the column arrays 18 is performed by transmitting from a transmit antenna from one column array 18 and receiving at a receive antenna 64 of an adjacent column array 18 in such a way that effective sampling points 66 are continuous across areas or spaces 19 between the column antenna arrays 18 as well as within apertures of the unit cells 30 of the individual antenna arrays 18. The example configurations allow modular antenna arrays 18 to be developed and deployed as larger multi-column array systems.

This modular approach also allows quasi-cylindrical or piecewise linear curved apertures to be formed for improved illumination coverage for a wide range of operational scenarios for personnel or other screening. These include various real-time imaging applications (front and back orientation, dual profile views, quasi-cylindrical arrangement, etc.), and static-mode (single frame) image capture. For example, the antenna arrays 18 are arranged in substantially a planar arrangement and the aperture of the antenna system 12 is at least substantially planar in the embodiment of FIG. 5. In other embodiments, for example as shown in FIG. 5A, the antenna arrays 18 are positioned to be in respective planes that are angled relative to one another about the target imaging volume 11 to form quasi-cylindrical or piecewise linear curved apertures about the target imaging volume 11. In some embodiments, the transmit and receive antennas of the antenna arrays 18 are positioned to be in respective different planes that are angled relative to one another about the target imaging volume.

As mentioned above, coherent combination of the antenna arrays 18 may be implemented where the transmit antennas 62 of a given column array 18 that are adjacent to another column array 18 are controlled to emit frequency sweeps that are received by receive antennas 64 of an adjacent column array 18 and that are adjacent to the transmitting column array 18 to provide effective sampling points 66 at locations between the antenna arrays 18 as shown in FIG. 5. The transmit and receive antennas of different antenna arrays 18 may be selected as pairs to provide substantially continuous effective sampling points 66 that are all located substantially the same distance from one another in spaces 19 between the column arrays 18.

In one example implementation, half of the samples in a space 19 between adjacent arrays 18 are obtained by receiving at a given first array 18 and transmitting from the adjacent second array 18, and the other half are obtained by transmitting from the second array 18 and receiving at the first array 18. This method results in approximately uniform and seamless sampling across at least substantially an entirety of the spaces 19 between arrays 18.

In one specific embodiment, the transmit antenna 62 in the bottom left corner of the middle column array 18 may emit frequency sweeps of electromagnetic energy that are received by the eight rightmost receive antennas 64 of each of the top and bottom rows of the bottom unit cell 30 of the left column array 18. In addition, the transmit antenna 62 in the bottom right corner of the left antenna array 18 may emit frequency sweeps of electromagnetic energy that are received by the eight leftmost receive antennas 64 of each of the top and bottom rows of the bottom unit cell 30 of the middle antenna array 18. While all of the transmit and receive antenna pairs of a given unit cell 30 may be selected to provide effective sampling points 66 across substantially an entirety of the aperture of the given unit cell 30 as discussed above with respect to FIG. 3, less than all of the possible transmit and receive antenna pairs between the antenna arrays 18 may be selected and scanned to provide the effective sampling points between the antenna arrays 18. For example, all of the transmit antennas 62 on the right side of the left antenna array 18 and all of the transmit antennas 62 on the left side of the middle antenna array 18 may be selected to emit electromagnetic energy while the eight rightmost receive antennas of each of the unit cells 30 of the left antenna array 18 and the eight leftmost receive antennas of each of the unit cells 30 of the middle antenna array 18 may be selected for the sampling points 66 located in the space 19 between the left and middle antenna arrays 18. This process may be repeated for different pairs of transmit antennas 62 and receive antennas 64 that are in the middle and right antenna arrays 18 to provide sampling points within the space 19 between the middle and right antenna arrays 18. Other methods are possible for selecting different pairs of transmit and receive antennas to provide the sampling points of the aperture.

In the illustrated embodiment of FIG. 5, substantially complete and approximately uniform coverage of the 2D aperture defined by axes as, $a_4$ is obtained. Slight vertical and horizontal gaps 61a, 63a in the coverage are shown due to a design assumption that the antennas have a minimum physical separation as mentioned above with respect to FIG. 3.

In some embodiments, a plurality of the receive antennas are selected to receive electromagnetic energy transmitted from one of the transmit antennas. Receiving energy emitted from one transmit antenna at multiple receive antennas reduces the image acquisition time by a factor equal to the number of simultaneous receptions. In one more specific embodiment, a signal transmitted from one transmit antenna is received by two receive antennas simultaneously. For example, within a single unit cell 30, a signal transmitted from a single transmit antenna 62 is received by two receive antennas 64 each located at one of the opposing horizontal edges, and therefore parallel receive antennas 64 may be used to sample the transmitted signal simultaneously. More than two parallel receptions from a single transmission may be performed simultaneously at the expense of more complex signal routing circuitry in additional embodiments.

It is understood that sufficiently large separation distances between a pair of transmit and receive antennas results in imaging artifacts that are caused by failure of the midpoint approximation of the sampling points (which relies on the validity of the assumption that the transmit and receive separation distance is significantly less than the distance of the antennas to a target being imaged). The configuration of FIG. 5 allows relatively large apertures to be formed and substantially entirely sampled using pairs of relatively closely spaced transmit and receive antennas (e.g., pairs of transmit and receive antennas are separated by distance that is less than a distance of the antennas to the target being imaged).

Specifications of one example antenna system 12 including three column arrays 18 as shown in FIG. 5 are set forth in Table B.

TABLE B

| System Parameter | Specification |
| --- | --- |
| Aperture Size | 1.3 m × 2.0 m |
| Array Design | Sparse multi-static 2D boundary array |
| Antenna Type | Logarithmic Spiral |
| Polarization | Circular |
| Transceiver Architecture | Frequency Modulated Continuous Wave |
| Frequency Range | 10-20 GHz |
| Frame Rate | 20 frames/sec |
| Lateral Resolution | 10 mm |
| Range Resolution | 15 mm |
| Imaging Volume | 2.0 m × 2.0 m × 1.0 m |
| Voxel Size | 8 mm |
| Overall System Size (both antenna systems) | 1.3 m × 2.0 m × 3.0 m |

As mentioned above, the antenna system of the embodiment of FIG. 5 has an at least substantially planar aperture. Referring to FIG. 5A, a plan view of another embodiment of an antenna system 12a is shown in a quasi-cylindrical arrangement. In the arrangement of FIG. 5A, the antenna arrays 18 are positioned to be in respective planes that are angled relative to one another to form quasi-cylindrical or piecewise linear curved apertures about target imaging volume 11. In one embodiment, the angles of the antenna arrays 18 are selected such that the center of each antenna array 18 (when viewed from above) intersects a common circle (or cylinder) that is centered at the expected location of the person 14 or other target in the volume 11. The angle of the adjacent antenna arrays 18 with respect to one another can be varied to approximate a cylindrical aperture with angles ranging from 0 to 45 degrees in example embodiments.

Figure 9:
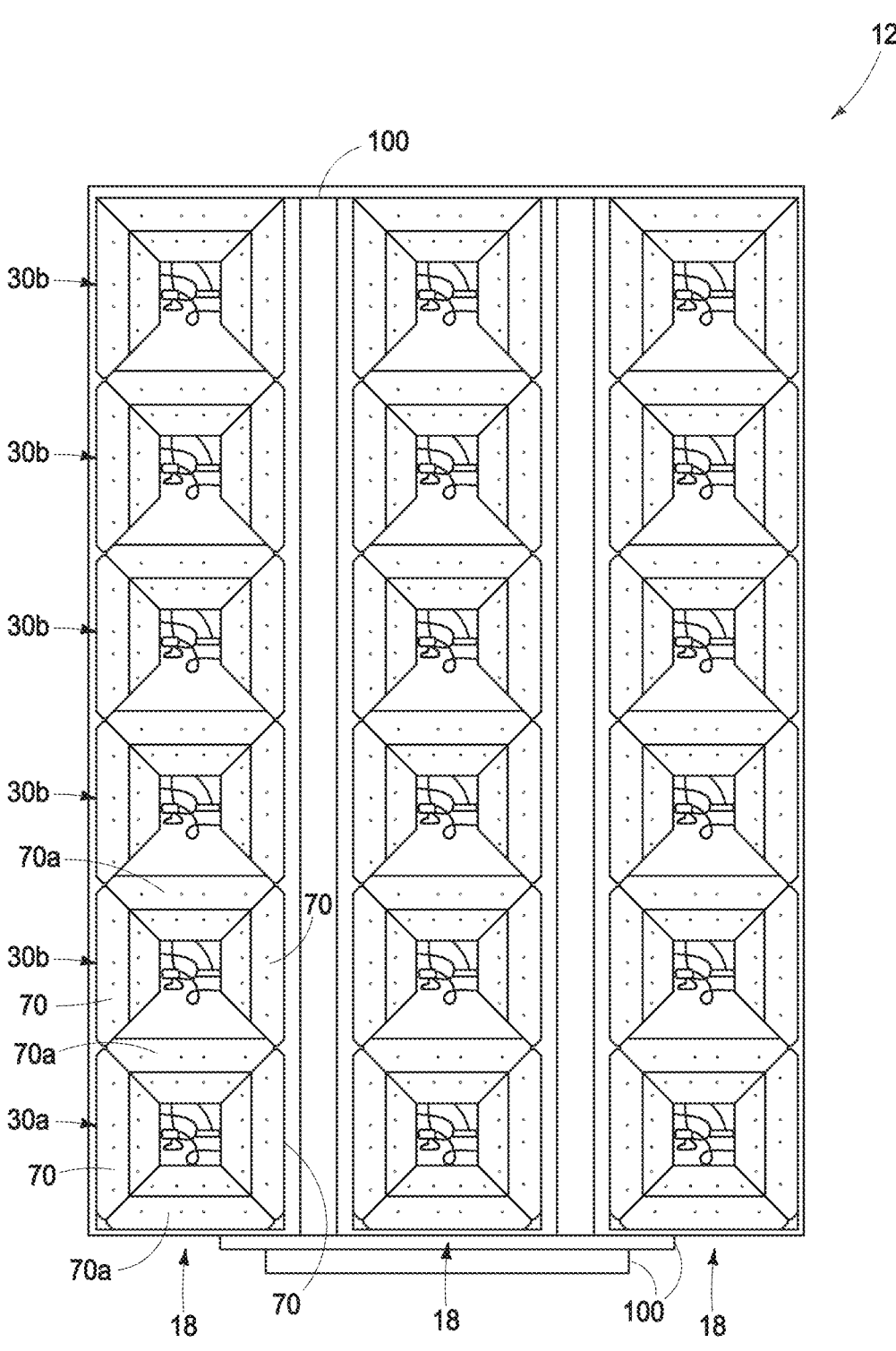
FIG. 9 is a front elevation view of an antenna system according to one embodiment.

Referring to FIG. 6A, one embodiment of a transmit switched array module 70 configured to transmit electromagnetic energy is shown. A plurality of the switched array modules 70 may be provided around a perimeter of a 2D aperture such as the aperture of a unit cell 30 illustrated in FIG. 3 and defined by axes $a_1$, $a_2$ (details of an example embodiment using switched array modules to form unit cells 30 is shown in FIG. 9).

Figure 8:
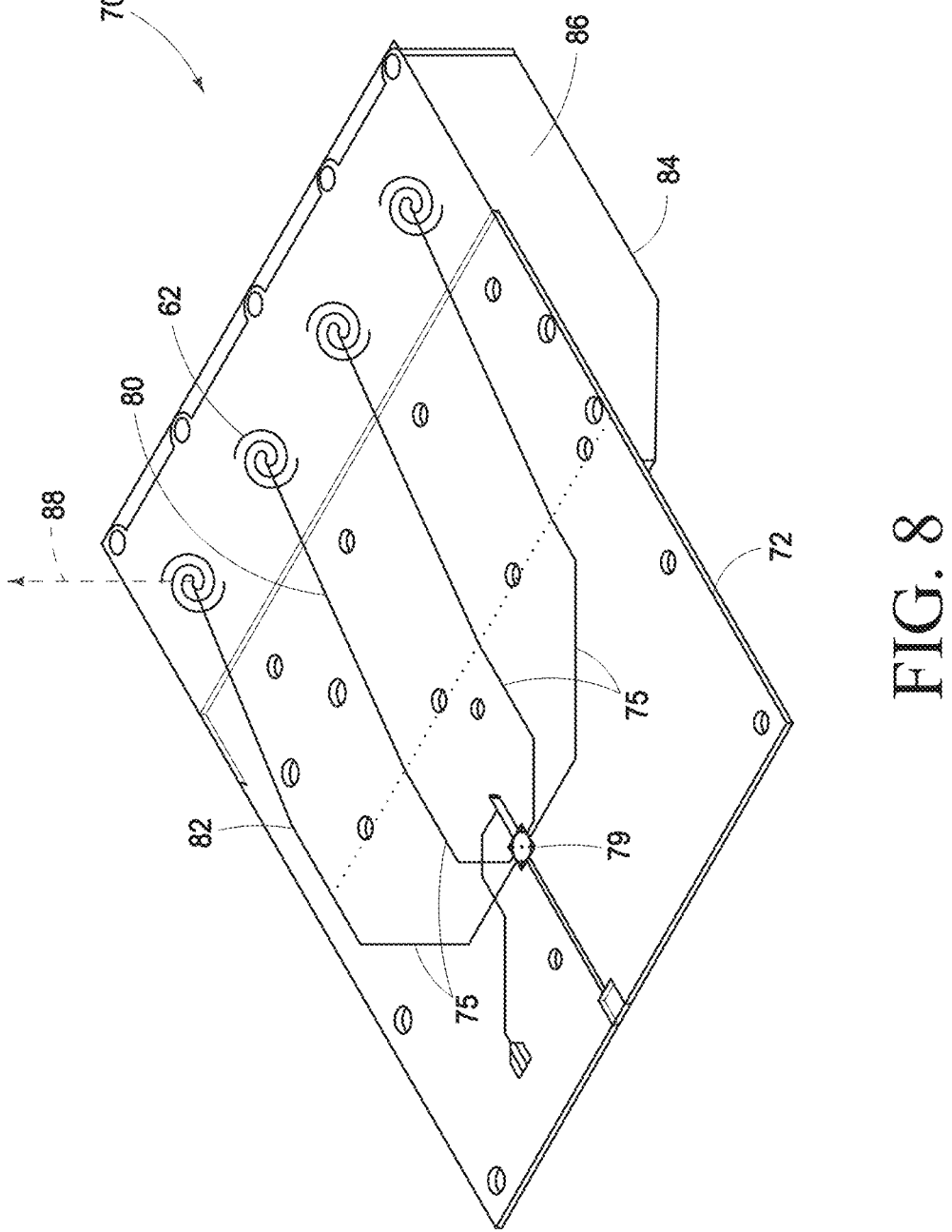
FIG. 8 is an isometric view of a fragment of a transmit switched array module according to one embodiment.

The illustrated module 70 has a single pole 16-throw (SP16T) configuration. The depicted module 70 includes a substrate 72 in the form of a printed circuit board (PCB) having a cavity housing or board (an example cavity housing is shown in FIG. 8) in one embodiment. In one specific embodiment, the PCB substrate 72 is a 0.012" 4003C laminate substrate available from Rogers Corp. The antennas are located on a two-layer portion of the PCB substrate 72 with the remaining components located on a four-layer portion of the PCB substrate 72.

The illustrated substrate 72 is in the shape of a trapezoid including parallel sides and plurality of transmit antennas 62 are positioned adjacent to one of the parallel sides of the substrate 72 that is longer than an other of the parallel sides of the substrate 72. In one embodiment, the unit cells 30 have an edge length of approximately 320 mm and utilize sixteen transmit antennas 62 along each edge. The edges of the module 70 between the parallel sides of the substrate 72 are mitered at 45° to allow integration into a boundary array architecture. Use of a trapezoidal outline for substrate 72 enables modules 70, 70a to be placed in a rectangular boundary array configuration in some embodiments with transmit and receive antennas closely spaced at the corners of the boundary array.

As mentioned above, the illustrated module 70 of FIG. 6A is a transmit module that includes sixteen transmit antennas 62. In the depicted embodiment, the antennas 62 are separated by one-wavelength (at the center frequency) or approximately 20 mm and the sampling points 66 are separated by one half of the wavelength in the described embodiment. The illustrated spiral antennas provide excellent circular polarization and gain performance having an average axial ratio lower than 3 dB and boresight gain above 0 dBi.

The module 70 includes an interface 74 coupled with substrate 72 that is configured to output and receive electrical signals with respect to circuitry external of the printed circuit board (e.g., array distribution circuits 32 discussed above). The electrical signals include operational power, control signals that control switching circuitry of the module 70, transmit signals that result in the transmission of electromagnetic energy for transmit module 70 (and receive signals corresponding to received electromagnetic energy for the receive switched array module 70a discussed below with respect to FIG. 6B).

The module 70 includes a plurality of conductors 75 coupled with the substrate 72 and configured to communicate the electrical signals between the interface 74 and the antennas 62. In one embodiment, the conductors 75 comprise conductive material such as copper upon an upper surface of the substrate 72.

The module 70 also includes amplification circuitry 76 coupled with the substrate 72 and interface 74. Amplification circuitry 76 is configured to increase an electrical characteristic (e.g., voltage) of the electrical signals communicated to the antennas 62 to transmit electromagnetic energy. In one embodiment, amplification circuitry 76 is implemented as a surface-mount device (SMD) that is coupled with a surface of the substrate 72.

The module 70 further includes switching circuitry 78 coupled with the substrate 72. Switching circuitry 78 is configured to selectively couple the interface 74 with different ones of the antennas 62 and different ones of the conductors 75 to implement selection of different transmit antennas 72 at different times to transmit electromagnetic energy to scan the target imaging volume. In one embodiment, switching circuitry 78 is implemented as surface-mount device (SMD) switching devices 79 that are coupled with a surface of the substrate 72. The switching devices 79 may be implemented as HMC641 non-reflective single pole 4-throw (SP4T) switches in one embodiment. The column distribution circuit 46 described above may be referred to as a controller that is configured to control the switching circuitry 78 to couple different antennas 62 with the interface 74 at different times to provide a plurality of different sampling points within an aperture of the imaging system.

The use of integrated SMD amplifiers and switching devices according to some embodiments reduces cabling, connectors, and overall complexity of the imaging system and integrated power and switching logic connections.

Figure 6B:
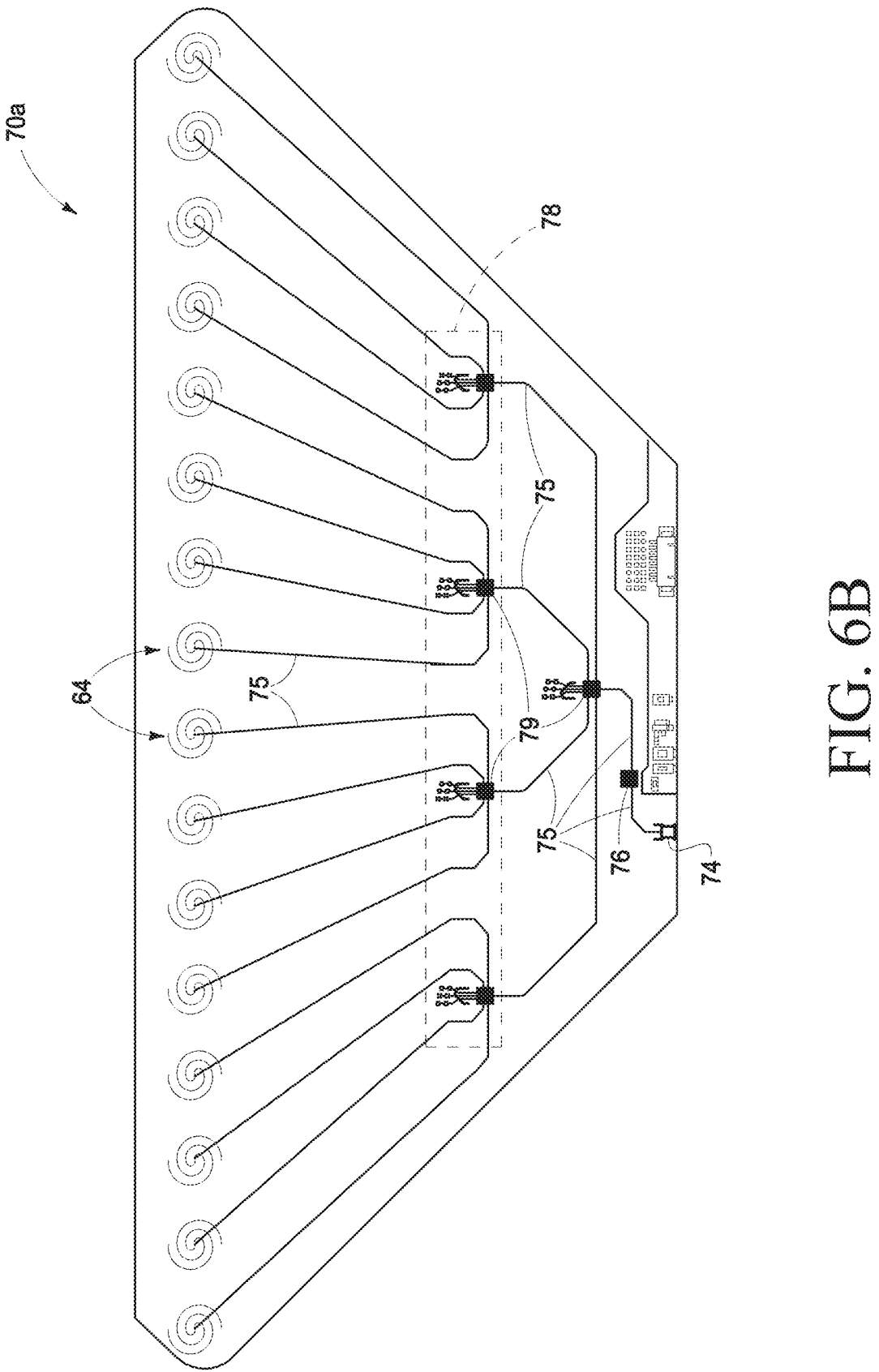

Another module 70a is shown in FIG. 6B that has a similar construction to the transmit module 70 of FIG. 6A but includes a plurality of receive antennas 64. The SP16T receive module 70a is the same design as transmit module 70 except for opposite circular polarization of the transmit and receive antennas (opposite rotational handedness of the antennas providing cross-circular polarization of the transmit and receive antennas) and opposite amplifier orientation that amplifies electrical signals received from the antennas 74 and provided to interface 74.

Figure 7B:
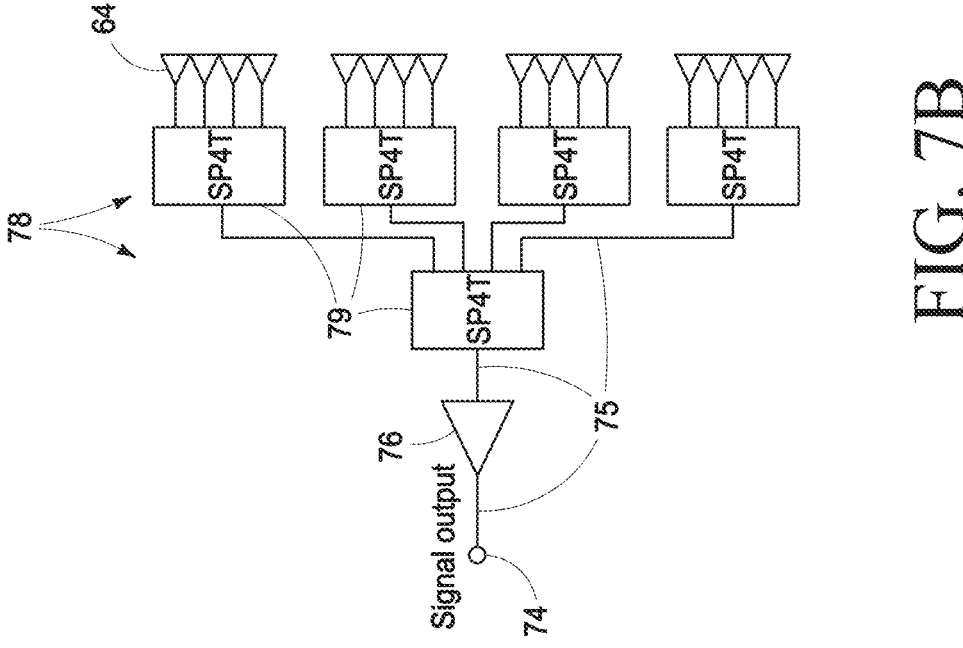
FIGS. 7A and 7B are schematic representations of circuitry of a transmit switched array module and a receive switched array module, respectively, according to example embodiments.
Figure 7A:
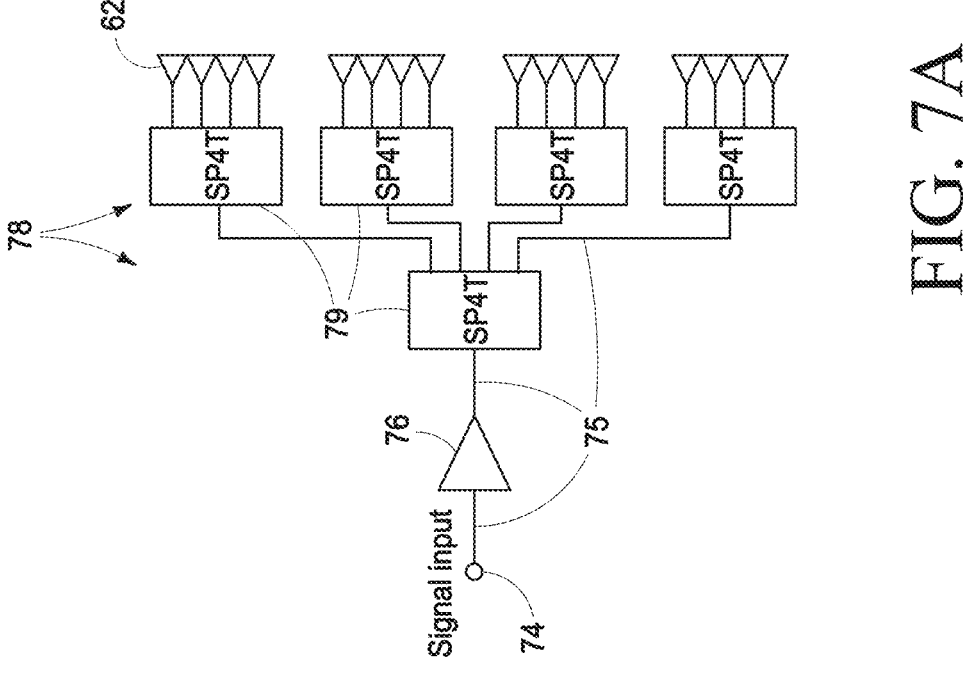

Referring to FIGS. 7A and 7B, schematic diagrams of circuitry of respective transmit and receive switched array modules 70, 70a are shown including interface 74, amplification circuitry 76, switching circuitry 78 and respective antennas 62, 64.

Referring to FIG. 8, a portion of a switched array module 70 including four transmit antennas 62 is shown according to one embodiment. The receive switched array module 70a including receive antennas 64 may also be configured as shown in FIG. 8 with the different configuration of the receive antennas compared with the transmit antennas and opposite amplifier orientation.

The depicted antennas 62 are edge-fed equiangular spiral planar antennas having 1.5 turns and an integrated tapered microstrip line balun 80. The antennas 62 are frequency-independent and exhibit wide bandwidth and a constant radiation pattern beamwidth with excellent circular polarization properties. An elliptically tapered microstrip-to-grounded coplanar waveguide (GCPW) transition 82 is used in the illustrated embodiment to connect the antennas 62 to the feed network. The antennas 62 have an assumed spacing of one wavelength at a center frequency of 15 GHz for transmission and reception of electromagnetic energy within a 10-20 GHz operating bandwidth of the scanning system (e.g., 20 mm). The example antennas 62, 64 have broad beamwidth/low gain (at least 60 degrees HPBW), relatively small size to fit within 20 mm spacing, circular polarization, are conducive to PCB fabrication and have a broadside unidirectional radiation pattern.

In addition, use of an edge-fed logarithmic spiral antenna design allows versatile transmit and receive switched array modules 70, 70a to be fabricated on printed-circuit boards using relatively low-cost, automated assembly in some embodiments. The illustrated example antenna element design uses cross-circular polarization, wide bandwidth, wide beamwidth, and broadside radiation. Cross-circular polarization enables rejection of multipath signals which reduces imaging artifacts. Wide beamwidth enables high lateral image resolution and wide bandwidth enables fine depth resolution. Broadside radiation allows convenient layout of the switched array modules into 2D planar or quasi-cylindrical array configurations. In addition, the example antenna designs ease integration with SMD switching and amplification.

Sixteen antenna elements are linearly arranged with associated signal distribution in the respective transmit and receive switched array modules 70, 70a. Cross-circular polarization is achieved with these modules 70, 70a by using the opposite rotational handedness for the transmit and receive modules 70, 70a. Use of circular polarization with broadside radiation has the additional advantage for boundary arrays of the polarization not being changed by in-plane rotation meaning the elements can be aligned vertically or horizontally without modifying the polarization. The transmit and receive modules 70, 70a provide wideband operation exceeding one full octave, or a 2:1 frequency range. Other antenna and module designs may be used in other embodiments.

The module 70 further includes a 3-D printed cavity housing 84 having conductively coated internal walls and that is filled a foam absorber 86, such as Arc Technologies LS-10054 foam absorber in one embodiment. The cavity housing 84 is 23 mm wide and 12.7 mm thick in one embodiment. The cavity housing 84 and foam 86 provide the module 70 with a unidirectional radiation pattern in a direction 88 that is substantially broadside or perpendicular to at least a substantially planar surface of substrate 72 and in a direction outwardly from the substrate surface that is opposite to the cavity housing 84 shown in FIG. 8.

Referring to FIG. 9, one antenna system 12 is shown that includes a plurality of antenna arrays 18 corresponding to the example embodiment of FIG. 5. The depicted arrays 18 are attached to a support structure 100 and arranged as identical columns that are separated from one another.

Each of the antenna arrays 18 includes a single unit cell 30a at the bottom position of the column array 18 with plural unit cells 30b thereover in the illustrated embodiment. The example unit cell 30a includes plural vertically-arranged transmit switched array modules 70 including plural transmit antennas 62 positioned at opposite sides of the unit cell 30a and plural horizontally-arranged receive switched array modules 70a including plural receive antennas 64 positioned at opposite sides of the unit cell 30a. Each example unit cell 30b includes plural opposing vertically-arranged transmit switched array modules 70 and a single horizontally-arranged receive switched array module 70a at the top of the unit cell 30b.

The switched array modules 70, 70a of a given unit cell 30a form a boundary array of the given unit cell 30a. The switched array modules 70, 70a of a given unit cell 30b form a boundary array of the given unit cell 30b along with the upper receive module 70a of the unit cell 30a, 30b that is immediately below the given unit cell 30b. The transmit and receive antennas of the modules 70, 70a are positioned in a common plane that corresponds to surfaces of respective modules 70, 70a in one embodiment.

Figures 10A, 10B:
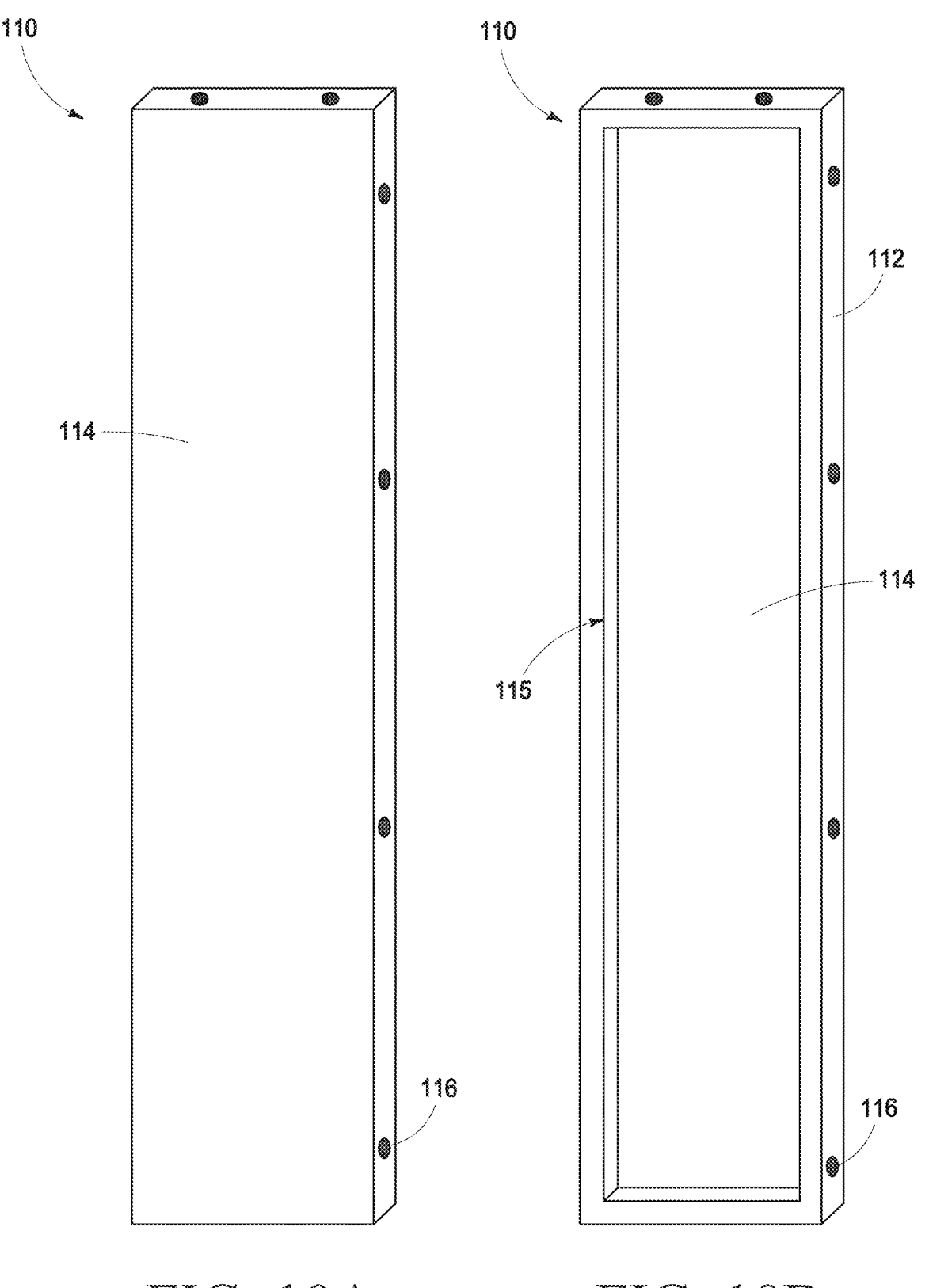
FIGS. 10A and 10B are perspective front and back views, respectively, of one embodiment of a radome.

Referring to FIG. 10a, a front of one embodiment of a radome 110 that may be used to protect an antenna array 18 is shown and a back of the example radome 110 is shown in FIG. 10b.

The depicted radome 110 includes electrostatic discharge safe material in the form of a 0.75" Rohacell foam frame 112 with a 0.5" thick Rohacell foam core 114 that is placed over a face of a respective antenna array 18. The foam core 114 is attached to the frame 112 in a manner to define a cavity 115 in the back of radome 110 that spaces the foam core 114 from the switched array modules 70a, 70b. The inside surface of the radome 110 may be lined with a 0.004" static-dissipative polyester film in one embodiment. The external outwardly facing surface is covered with a black vinyl film in one embodiment. Plural nylon rivets 116 may be placed around a perimeter of the radome 114 for attachment to a respective antenna array 18.

Although not shown, an absorber foam panel may be provided over the outwardly-facing surface of each unit cell 30a, 30b in some embodiments. An example absorber foam panel is a 0.5" thick LS-10054 absorber available Arc Technologies with a 0.125" polycarbonate cover.

The discussion proceeds with respect to example aperture weighting terms $w(a_1, a_2)$ that may be used in Eqs. 1 and 3 set forth above. The aperture weighting term may be used in the described image reconstruction formulas to control sidelobes in synthetic aperture radar imaging systems. For scanned apertures, a Hamming, Hanning, Kaiser, or other window function may be applied to each aperture dimension of the data, $S(a_1, a_2, f)$, to reduce sidelobes in the lateral and depth dimensions. Windowing the data along the frequency axis controls sidelobes in the range direction.

Aperture weighting described herein assumes that each sample is acquired at a single transceiver position (i.e., sampling point). In one embodiment, the phase centers (midpoints) of pairs of the transmit (T) and receive (R) antenna positions are used as sampling points which is consistent with the design basis for antenna arrays having rectangular boundaries for example as discussed herein with respect to FIGS. 3, 5 and 5a.

Referring again to FIG. 3, the effective sampling of the aperture is substantially uniform for the majority of four quadrants of the unit cell 30 (corresponding to region 130 of FIG. 12 discussed below) where the sampling points 66 are uniformly spaced from adjacent sampling points 66 by at least substantially the same distance. However, vertical and horizontal gaps 61, 63 in the sampling points 66 extend vertically and horizontally cross the unit cell 30 (corresponding to region 132 of FIG. 12 discussed below) as described above where the sampling is not uniform and the sampling points 66 are not spaced a substantially uniform distance with respect to adjacent sampling points 66. Vertical and horizontal gaps 61a, 63a are also present and appear in a periodic manner in larger arrays composed of additional antenna elements such as shown in FIG. 5. It is desirable in some applications to mitigate these non-uniformities to reduce artifacts in the reconstructed images. In some embodiments, aperture weighting may be applied to compensate for non-uniform sampling caused by the vertical and horizontal gaps 61, 63 and reduce the presence of artifacts in the reconstructed images.

Figure 11:
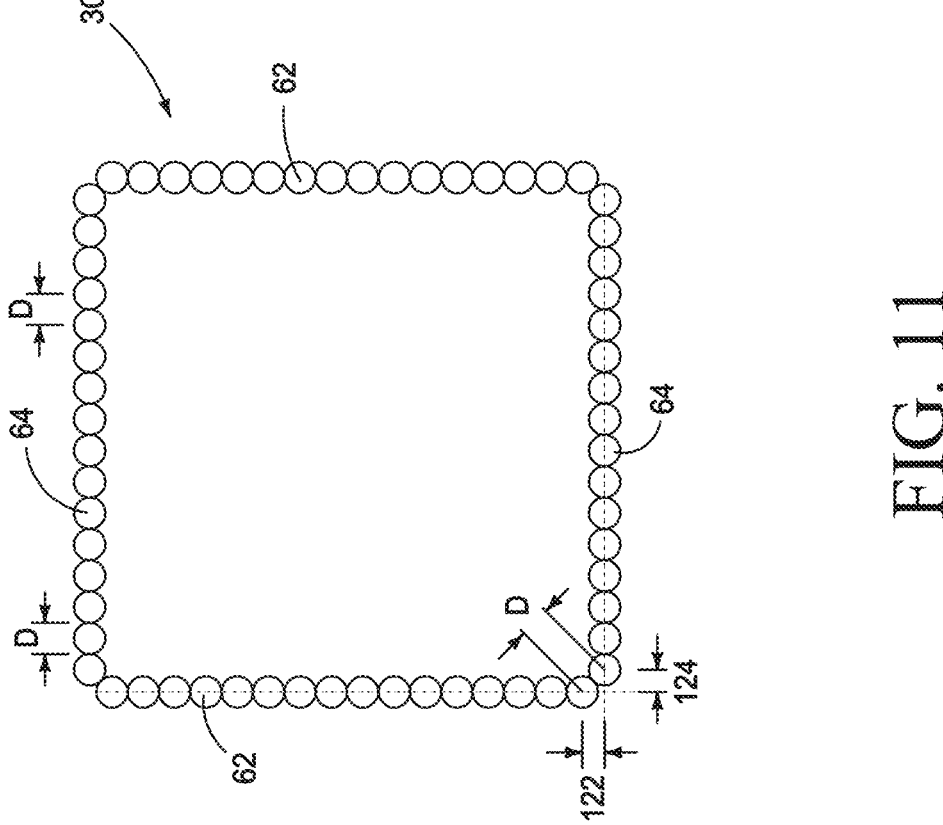
FIG. 11 is an illustrative representation of a unit cell according to one embodiment.

Referring to FIG. 11, the size of the vertical and horizontal sampling gaps 61, 63 corresponds to the size of offsets between the edges of the transmit and receive antennas 62, 64. In some embodiments, the transmit and receive antennas are dedicated to either transmit or receive operation and are not capable of doing both. In addition, the transmit and receive antennas are each assumed to occupy an approximate circular area having a diameter D that is limited by the element spacing between antennas 62, 64.

As shown in FIG. 11, a vertical offset 122 and a horizontal offset 124 are depicted between the edges of the transmit antennas 62 and the edges of the receive antennas 64 for the illustrated unit cell 30 having a rectangular boundary, and accordingly, at least some of the antennas 62, 64 are offset with respect to another. The offset of the antennas 62, 64 causes some of the sampling points 66 to not be uniformly spaced from neighboring adjacent sampling points 66 as discussed below with respect to FIG. 12.

Figures 12, 12A:
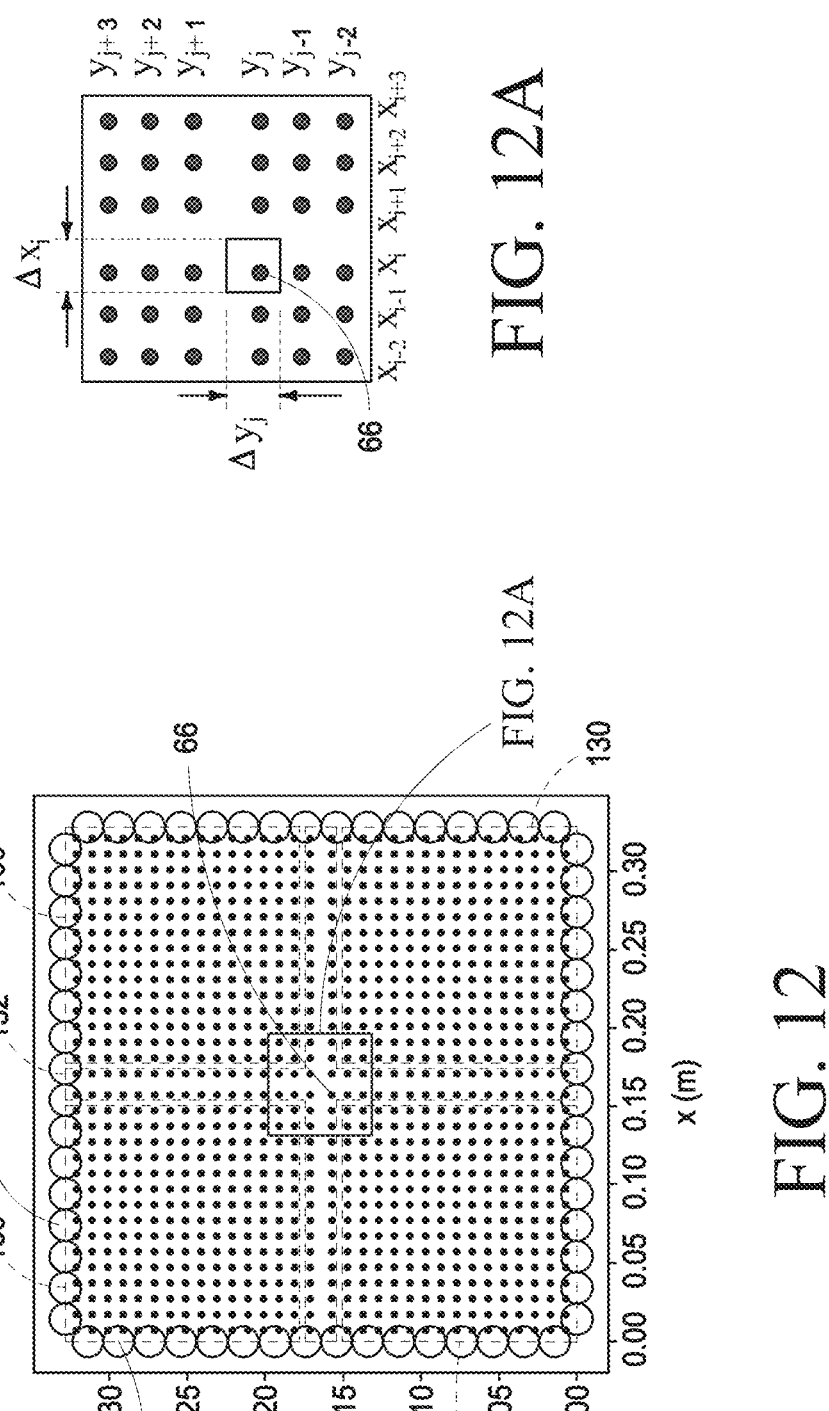
FIG. 12 is an illustrative representation of different regions of a unit cell according to one embodiment.
FIG. 12A shows details of a center region of the unit cell of FIG. 12.

The transmit and receive antennas 62, 64 do not overlap in the embodiments shown in FIGS. 3 and 5 which minimizes the spacing between the transmit and receive antennas 62, 64 at the corners of the unit cell 30. In one embodiment, each of the vertical and horizontal offsets 122, 124 is equal to $D/\sqrt{2}$ resulting in a minimum center to center spacing of D for the transmit and receive antennas 62, 64 in the corners of the unit cell 30. This spacing of the antennas 62, 64 in the corners is consistent with the spacing of D between the other transmit and receive antennas 62, 64 of the unit cell 30 not positioned in the corners of the aperture. This example arrangement results in at least substantially unform effective sampling interval of $D/\sqrt{2}$ of the sampling points 66 within the quadrants of region 130 of the imaging aperture. The presence of gaps 61, 63 result in slightly larger sampling interval of $D/\sqrt{2}$ of the sampling points within region 132 and as shown in FIG. 12.

The multistatic image reconstruction methods described herein perform three-dimensional imaging using two-dimensional apertures and summation over the two aperture axes is made to approximate surface integration in some embodiments. As discussed below, the sampling points of the imaging aperture of a unit cell 30 are associated with a plurality of areas of the imaging aperture.

For non-extreme scenarios in which the aperture is flat and sampling is performed in a monotonic way along each aperture axis, a surface integration may be achieved by setting the aperture weighting term to $w(a_1, a_2) = \Delta A$, where $\Delta A$ is the differential area defined by the aperture position and its nearest neighbors.

A general multistatic array having the transmit and receive antennas 62, 64 located at the boundary or perimeter of the antenna array as shown in FIG. 3 can be described by the locations of the transmit and receive antennas 62, 64 and have associated transmit/receive midpoints corresponding to effective sampling points 66 defined by two-dimensional coordinates $(x_i, y_i)$ where i and j are indices into the $a_1$, and $a_2$ axes, respectively.

A unit cell 30 having transmit and receive antennas 62, 64 located about a perimeter of the unit cell 30 is shown in FIG. 12, and FIG. 12a shows details of a sub-area located at the middle of the aperture of the unit cell 30. The aperture weighting for radar data associated with a sampling point 66 is proportional to the differential area surrounding the sampling point 66 in one embodiment. The differential area about a sampling point 66 is defined by $$\Delta A_{i,j} = \Delta x_i \Delta y_j \qquad \text{Eq. 6}$$

and the differential lateral width is defined by $$\Delta x_i = \frac{x_i - x_{i-1}}{2} + \frac{x_{i+1} - x_i}{2} = \frac{x_{i+1} - x_{i-1}}{2} \qquad \text{Eq. 7}$$

and the differential vertical height is defined by $$\Delta y_j = \frac{y_j - y_{j-1}}{2} + \frac{y_{j+1} - y_j}{2} = \frac{y_{j+1} - y_{j-1}}{2} \qquad \text{Eq. 8}$$

Accordingly, the locations of the sampling points 66 in the imaging aperture is used to determine the areas that are associated with the respective sampling points 66 in one embodiment.

For an array defined by horizontal axis $a_1$, and vertical axis $a_2$, the aperture weighting (e.g., differential area) for a sampling point 66 at a given location (i, j) is defined by $$w(a_{1,i}, a_{2,j}) = \frac{x_{i+1} - x_{i-1}}{2} \frac{y_{j+1} - y_{j-1}}{2} \qquad \text{Eq. 9}$$

The aperture weighting described by Eq. 9 approximately compensates for the non-uniform effective sampling in region 132 resulting from the positioning of the antennas in the corner of the aperture of the antenna array. The aperture weighting in Eq. 9 may be further multiplied by a window function to control sidelobe levels in some embodiments and frequency windowing may be added to the range response calculation (i.e., multiplied prior to performing the iFFT of Eq. 4). The processing circuitry 57 of FIG. 2 may be utilized to perform the aperture weighting of Eq. 9 in one embodiment.

Referring again to FIG. 12, the imaging aperture includes a first region 130 where the sampling points 66 therein are at least substantially uniformly spaced from adjacent sampling points 66 within first region 130 (e.g., a given sampling point 66 in region 130 is uniformly spaced from the nearest adjacent neighbors in region 130). The imaging aperture also includes a second region 132 where the sampling points 66 therein are not uniformly spaced from adjacent sampling points 66 within second region (e.g., a given sampling point 66 in region 132 is not uniformly spaced from the nearest adjacent neighbors in region 132).

Figure 13:
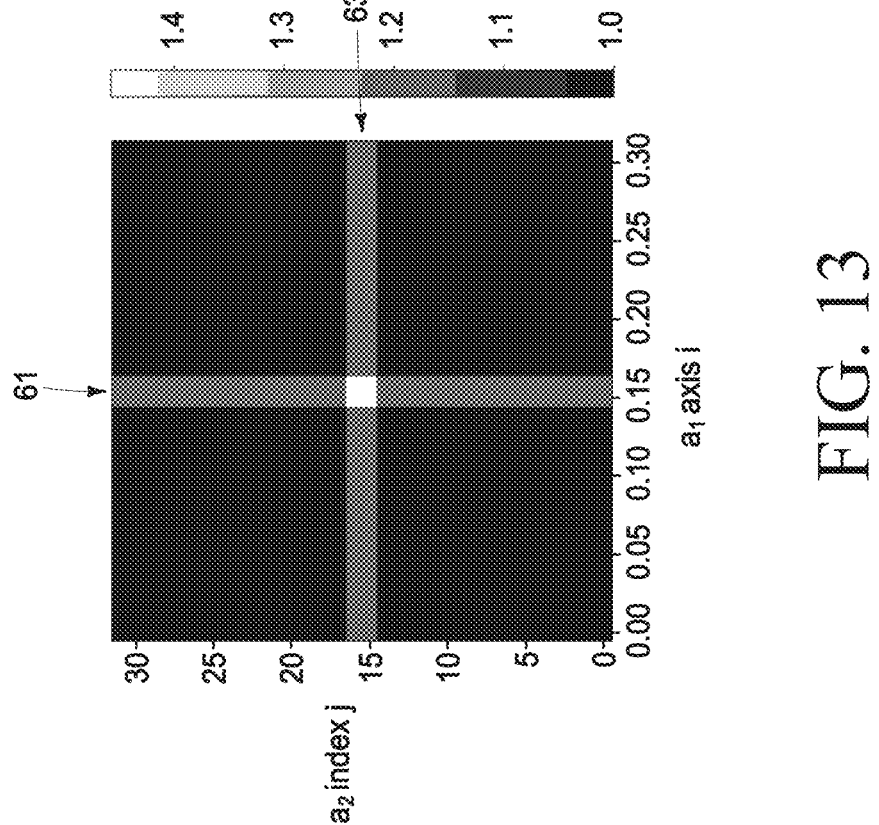
FIG. 13 is a grey-scale image of one embodiment of an aperture weighting function for a unit cell.

Referring to FIG. 13, a gray-scale image of the aperture weighting function for a unit cell is shown on a scale of 1.0 to 1.45. The illustrated aperture weighting is normalized by the smallest differential area, therefore the weightings in the uniformly sampled region 130 are equal to 1.0. Increased weighting of the radar data of sampling points adjacent to gaps 61, 63 and within region 132 is also shown to account for the increased differential areas associated with the sampling points that are located adjacent to gaps 61, 63 and within region 132. The aperture weighting function accordingly increases the intensity of the radar data associated with the sampling points that are located adjacent to gaps 61, 63 and within region 132. As shown, the largest weighting is provided to the sampling points located at the center of region 132 corresponding to the respective sampling points having increased associated differential areas compared with the areas of other sampling points of the aperture.

As mentioned above, the sampling points 66 of the imaging aperture of the unit cell 30 are associated with a plurality of different areas which may be different sizes of the imaging aperture. In example embodiments, the radar data of the sampling points is weighted differently by the aperture weighting function and corresponding to the different sizes of areas associated with the respective sampling points. A plurality of different weightings may be determined using Eq. 9 corresponding to the different sizes of the areas of the aperture associated with the respective sampling points and the determined different weightings are used to focus the radar data associated with the respective sampling points in one embodiment.

The aperture weighting of radar data associated with a sampling point 66 is proportional to the differential area surrounding the respective sampling point 66 in one embodiment described above. The sampling points located in region 130 of the imaging aperture are at least substantially uniformly spaced from one another and are associated with differential areas of at least substantially the same size. The radar data associated with the sampling points within region 130 is weighted using at least substantially the same weighting using Eq. 9 (i.e., the radar data of the sampling points 66 in the first region 130 is weighted at least substantially the same). The sampling points located in region 132 of the imaging aperture are not unfirmly spaced from adjacent sampling points in region 132 and the sampling points in the second region 132 are associated with differential areas of different sizes. The radar data associated with the sampling points within region 132 are weighted an increased amount using Eq. 9 compared with the radar data associated with the sampling points within region 130.

Example embodiments disclosed herein are directed towards advanced imaging systems and associated methods for the screening of personnel or other targets for concealed weapons, explosives, and other contraband. Some of the disclosed imaging systems are able to screen a person as the person walks past one or more antenna systems 12. The imaging systems collect and process radar data continuously at 10-20 frames per second to form real-time video rate image generation in some embodiments. Generated radar data may be mathematically focused to form dynamic 3D images of the person which ultimately reveal concealed objects according to some embodiments.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An imaging system comprising:
an antenna array comprising a plurality of antennas configured to transmit electromagnetic energy towards a target imaging volume and receive electromagnetic energy from the target imaging volume, and wherein the antennas provide a plurality of sampling points that are associated with a plurality of different areas of an imaging aperture, and wherein the areas of the imaging aperture have a plurality of different sizes;
a data acquisition system coupled with the antenna array and configured to output radar data for the sampling points, and wherein the radar data results from the transmission and reception of the electromagnetic energy with respect to the target imaging volume; and
processing circuitry coupled with the data acquisition system, and wherein the processing circuitry is configured to focus the radar data to generate an image of the target imaging volume, and wherein the processing circuitry is configured to weight the radar data of the sampling points differently during the focusing and corresponding to the different sizes of the areas associated with the sampling points.

2. The imaging system of claim 1 wherein the area of the imaging aperture associated with a first of the sampling points is greater than the area of the imaging aperture associated with a second of the sampling points, and the processing circuitry is configured to weight the radar data of the first sampling point an increased amount compared with the weighting of the radar data of the second sampling point.

3. The imaging system of claim 1 wherein the different weighting is proportional to the different sizes of the areas of the imaging aperture.

4. The imaging system of claim 1 wherein some of the areas of the imaging aperture have at least substantially the same size, and the processing circuitry is configured to weight the radar data of some of the sampling points that are associated with the some areas using at least substantially the same weighting.

5. The imaging system of claim 1 wherein the antennas include a plurality of transmit antennas configured to transmit the electromagnetic energy and a plurality of receive antennas configured to receive the electromagnetic energy, and a plurality of pairs of the transmit and receive antennas correspond to respective ones of the sampling points.

6. The imaging system of claim 5 wherein the antenna array and the imaging aperture have a rectangular boundary and the transmit and receive antennas are located at different positions of a perimeter of the rectangular boundary.

7. The imaging system of claim 6 wherein the transmit antennas are located at first opposite sides of the rectangular boundary and the receive antennas are located at second opposite sides of the rectangular boundary.

8. The imaging system of claim 1 wherein some of the sampling points are within a first region of the imaging aperture and are at least substantially uniformly spaced from adjacent ones of the sampling points within the first region and others of the sampling points are within a second region of the imaging aperture and are not uniformly spaced from adjacent ones of the sampling points within the second region.

9. The imaging system of claim 8 wherein the antennas are located at positions that are offset with respect to one another that cause the others of the sampling points to not be uniformly spaced.

10. The imaging system of claim 1 wherein the processing circuitry is configured to use a plurality of locations of the sampling points to determine the areas that are associated with the sampling points.

11. An imaging system comprising:

an antenna array comprising a plurality of antennas configured to transmit electromagnetic energy towards a target imaging volume and receive electromagnetic energy from the target imaging volume, and wherein the antennas are configured to provide an imaging aperture having a first region comprising a plurality of sampling points that are at least substantially uniformly spaced from adjacent ones of the sampling points within the first region and a second region comprising a plurality of sampling points that are not uniformly spaced from adjacent ones of the sampling points within the second region;

a data acquisition system coupled with the antenna array and configured to output radar data for the sampling points, and wherein the radar data results from the transmission and reception of the electromagnetic energy with respect to the target imaging volume; and processing circuitry coupled with the data acquisition system, and wherein the processing circuitry is configured to focus the radar data to generate an image of the target imaging volume, and wherein the processing circuitry is configured to weight the radar data of the sampling points within the first region at least substantially the same during the focusing and to weight the radar data of the sampling points within the second region differently during the focusing.

12. The imaging system of claim 11 wherein the sampling points are associated with a plurality of different areas of the imaging aperture, the areas of the imaging aperture associated with the sampling points within the first region are at least substantially the same size, and the areas of the imaging aperture associated with the sampling points within the second region are different sizes.

13. The imaging system of claim 12 wherein the area of the imaging aperture associated with a first of the sampling points within the second region is greater than the area of the imaging aperture associated with a second of the sampling points within the first region, and the processing circuitry is configured to weight the radar data of the first sampling point an increased amount compared with the weighting of the radar data of the second sampling point.

14. The imaging system of claim 11 wherein the antennas include a plurality of transmit antennas configured to transmit the electromagnetic energy and a plurality of receive antennas configured to receive the electromagnetic energy, and a plurality of pairs of the transmit and receive antennas correspond to respective ones of the sampling points.

15. The imaging system of claim 14 wherein the antenna array and the imaging aperture have a rectangular boundary and the transmit and receive antennas are located at different positions of a perimeter of the rectangular boundary.

16. The imaging system of claim 15 wherein the transmit antennas are located at first opposite sides of the rectangular boundary and the receive antennas are located at second opposite sides of the rectangular boundary.

17. The imaging system of claim 11 wherein the antennas are located at positions that are offset with respect to one another that cause the others of the sampling points to not be uniformly spaced.

18. An imaging system comprising:

processing circuitry configured to:

access radar data for a plurality of sampling points at a plurality of different locations of an imaging aperture, and wherein the radar data results from the transmission and reception of electromagnetic energy via an antenna array with respect to a target imaging volume;

access a plurality of different weightings that correspond to different ones of the sampling points of the imaging aperture;

focus the radar data of the sampling points to generate an image of the target imaging volume; and wherein the processing circuitry is configured to use the different weightings of the sampling points to focus the radar data of respective ones of the sampling points.

19. The imaging system of claim 18 wherein the sampling points are associated with a plurality of different areas of the imaging aperture and the areas of the imaging aperture have a plurality of different sizes.

20. The imaging system of claim 19 wherein the area of the imaging aperture associated with a first of the sampling points is greater than the area of the imaging aperture associated with a second of the sampling points, and the processing circuitry is configured to use the different weightings to weight the radar data of the first sampling point an increased amount compared with the weighting of the radar data of the second sampling point.

21. The imaging system of claim 19 wherein the different weightings are proportional to the different sizes of the areas of the imaging aperture.

22. The imaging system of claim 19 wherein some of the sampling points are associated with some of the areas of the imaging aperture having at least substantially the same size, and the processing circuitry is configured to focus the radar data of the some sampling points using at least substantially the same weighting.

23. The imaging system of claim 1 wherein the antenna array and the antennas are stationary during the transmission and reception of the electromagnetic energy.

24. The imaging system of claim 1 wherein the processing circuitry is configured to weight the radar data of a given one of the sampling points the same during the focusing of different radar data to generate different images of the target imaging volume at different moments in time.

25. The imaging system of claim 1 wherein the locations of the antennas within the antenna array provide the sampling points associated with the different areas of the imaging aperture having the different sizes.

26. The imaging system of claim 11 wherein the antenna array and the antennas are stationary during the transmission and reception of the electromagnetic energy.

27. The imaging system of claim 18 further comprising the antenna array, and wherein the antenna array is stationary during the transmission and reception of the electromagnetic energy via the antenna array.

\* \* \* \* \*